(12) United States Patent
Ogasawara

(10) Patent No.: US 8,490,734 B2
(45) Date of Patent: Jul. 23, 2013

(54) ENGINE INCLUDING CLUTCH ACTUATOR

(75) Inventor: Atsushi Ogasawara, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 1280 days.

(21) Appl. No.: 11/925,153

(22) Filed: Oct. 26, 2007

(65) Prior Publication Data

US 2008/0128239 A1 Jun. 5, 2008

(30) Foreign Application Priority Data

Nov. 30, 2006 (JP) .................................. 2006-323483

(51) Int. Cl.
*B62D 61/02* (2006.01)
*F16D 25/12* (2006.01)
*F16D 21/00* (2006.01)

(52) U.S. Cl.
USPC ................... 180/230; 192/85.63; 192/48.609; 192/48.611

(58) Field of Classification Search
USPC ............. 180/21, 219, 230; 192/85 R, 48.611, 192/48.609, 85.63; 123/198 R
See application file for complete search history.

(56) References Cited

U.S. PATENT DOCUMENTS

| 3,566,707 A | | 3/1971 | Schulz | |
|---|---|---|---|---|
| 4,648,359 A | * | 3/1987 | Ito | 123/90.31 |
| 5,065,644 A | * | 11/1991 | Shimada | 74/603 |
| 5,439,585 A | * | 8/1995 | Arakawa | 180/219 |
| 5,743,219 A | * | 4/1998 | Iio et al. | 123/54.4 |
| 6,564,663 B2 | | 5/2003 | Rioux et al. | |
| 6,641,503 B1 | * | 11/2003 | Bigi | 477/78 |
| 7,174,984 B2 | * | 2/2007 | Kosugi et al. | 180/219 |
| 7,316,626 B2 | * | 1/2008 | Oishi et al. | 474/144 |
| 7,380,630 B2 | * | 6/2008 | Yamada et al. | 180/230 |
| 7,527,119 B2 | * | 5/2009 | Iizuka et al. | 180/227 |
| 7,562,597 B2 | * | 7/2009 | Mashita | 74/331 |
| 7,575,083 B2 | * | 8/2009 | Kosugi et al. | 180/219 |
| 7,647,995 B2 | * | 1/2010 | Ishida et al. | 180/68.1 |
| 7,954,584 B2 | * | 6/2011 | Tsukada et al. | 180/219 |
| 8,403,093 B2 | * | 3/2013 | Kosugi et al. | 180/230 |
| 2002/0043237 A1 | * | 4/2002 | Nomura et al. | 123/196 R |
| 2005/0107194 A1 | * | 5/2005 | Oishi et al. | 474/28 |
| 2008/0099305 A1 | * | 5/2008 | Ogasawara | 192/82 R |

FOREIGN PATENT DOCUMENTS

| JP | 63-61631 A | 3/1988 |
|---|---|---|
| JP | 63-125490 A | 5/1988 |
| JP | 6-67810 U | 9/1994 |
| JP | 2000-104520 A | 4/2000 |
| WO | 2007/024137 A1 | 3/2007 |

* cited by examiner

*Primary Examiner* — J. Allen Shriver, II
*Assistant Examiner* — James M Dolak
(74) *Attorney, Agent, or Firm* — Westerman, Hattori, Daniels & Adrian, LLP

(57) ABSTRACT

An engine includes a crankshaft for transmitting rotational drive power to a drive wheel, a clutch mechanism for connecting or disconnecting the transmission of rotational drive power of the crankshaft, and clutch actuators. The crankshaft, clutch mechanism, and clutch actuators are accommodated in an engine case. The clutch actuators control the clutch mechanism and are positioned outside the clutch mechanism, viewed from the crankshaft direction.

10 Claims, 21 Drawing Sheets

ENGINE INCLUDING CLUTCH ACTUATOR

FIELD OF THE INVENTION

The present invention relates to an engine including clutch actuators suitable for a saddle-ride type vehicle such as a motorcycle.

BACKGROUND OF THE INVENTION

It is known to have an engine having an engine case, wherein on an upper surface of the engine case (e.g., which accommodates a crankshaft, a clutch mechanism, and a transmission mechanism) there is provided an oil passage controlling apparatus that controls switching of oil passages so as to control the operations of other components (e.g., the transmission mechanism). Such an engine structure is known to include a cover which covers the oil passage controlling apparatus (for example, refer to JP-A No. S63-125490.)

One problem with this known structure is that the provision of a special cover for covering the oil passage controlling apparatus (the apparatus that controls the operations of the other components) increases both weight and cost (e.g., due to an increase in the number of components.) Another problem is that the oil passage controlling apparatus that controls the operations of the other components using the oil passages is located outside the engine case; thus hydraulic pathways provided between the oil passage controlling apparatus and the engine case cross over the engine case. Accordingly, high sealing performance is required between the oil passage controlling apparatus and the engine case, which has an impact on the attachability of the oil passage controlling apparatus.

With respect to the apparatus that controls the operations of the other components, particularly in an engine including clutch actuators which control a connecting/disconnecting operation of a clutch mechanism, one object of the present invention is to reduce the number of components and to improve the attachability of the clutch actuators by eliminating a cover for the clutch actuators.

SUMMARY OF THE INVENTION

According to the present invention, in order to attain the above objectives, a first aspect of the present invention provides an engine (for example, an engine 13, 13a, 13b, 13b', 13c, 213, 213a, or 213b in embodiments), which includes clutch actuators, including: a clutch mechanism (for example, a twin clutch 26 in the embodiments) which is provided in a power transmission pathway through which a rotational drive power of a crankshaft (for example, a crankshaft 21 or 221 in the embodiments) is transmitted to a drive wheel (for example, a rear wheel 11 in the embodiments) and which connects or disconnects the transmission of the rotational drive power of the crankshaft to the drive wheel-side; an engine case (for example, an engine case 14A or 214A in the embodiments) in which the clutch mechanism and the crankshaft are accommodated; and clutch actuators (for example, clutch actuators 91a and 91b, or 91a' and 91b' in the embodiments) which control a connecting/disconnecting operation of the clutch mechanism, wherein the clutch actuators are arranged around the clutch mechanism, viewed from the crankshaft direction, and inside the engine case.

Accordingly, an outer wall of the engine case can be used as a cover for the clutch actuators. Accordingly, it is not necessary to provide an additional cover, and it is possible to reduce the weight and cost by suppressing an increase in the number of components. In addition, the clutch actuators can be closer to the clutch mechanism. Accordingly, it is possible to simplify and downsize interconnected means provided therebetween.

In the case where the interconnected means are hydraulic pathways, if the clutch actuators are provided outside the engine case, high sealing performance is required in a region (where the hydraulic pathways cross over the engine case) where the clutch actuators are attached to the engine case. However, by providing the clutch actuators inside the engine case, high sealing performance is not required in the region to which the clutch actuators are attached, and thus it is possible to improve the attachability of the clutch actuators.

According to another aspect of the present invention, the engine includes clutch actuators, wherein the engine case includes a crankcase (for example, a crankcase 14 or 214 in the embodiments) for rotatably supporting the crankshaft, and the clutch actuators are provided in the crankcase.

Accordingly, the clutch actuators can be supported by the crankcase with relatively-high rigidity. Thus, there is no need of providing an additional supporting structure for the clutch actuators, and it is possible to simplify the engine case structure.

According to another aspect of the present invention, the engine includes clutch actuators, wherein the engine case includes the crankcase (for example, a crankcase 14 or 214 in the embodiments) for rotatably supporting the crankshaft and a clutch cover (for example, a clutch cover 105 or 225 in the embodiments) which forms a clutch chamber (for example, a clutch case 105A or 225A in the embodiments) that is coupled to the crankcase to, together with the crankcase, accommodate the clutch mechanism, and the clutch actuators are provided in the clutch cover.

Accordingly, the clutch actuators and the clutch mechanism can be arranged closer to each other. Accordingly, it is possible to further simplify and downsize interconnected means provided therebetween. Further, the interconnected means can be consolidated in the clutch cover, so that the attachability of and the ease of maintenance for the clutch controlling system can be improved.

According to another aspect of the present invention, the engine includes clutch actuators, wherein: a connecting/disconnecting operation of the clutch mechanism is controlled by a hydraulic pressure supplied through the clutch actuators; the clutch actuators include cylinders (for example, cylinders 93 or 93' in the embodiments) to which a plurality of oil passages are connected, pistons (for example, pistons 94 in the embodiments) which are operated inside the cylinders to switch communication states of the respective oil passages, and linear solenoids (for example, linear solenoids 95 in the embodiments) which control operations of the pistons; and the cylinders are provided integrally with the engine case.

Accordingly, assembling of the clutch actuators, and attaching of the clutch actuators to the engine case can be easily performed only by inserting the pistons into the cylinders and by attaching the linear solenoids.

According to another aspect of the present invention, the engine includes clutch actuators, wherein the clutch actuators are arranged above the clutch mechanism.

Accordingly, it is possible to shorten electric power supplying harnesses, which extend from upper portions of the vehicle, for the clutch actuators, and to facilitate the connecting work.

According to another aspect of the present invention, the engine includes clutch actuators, wherein the clutch actuators are arranged below the clutch mechanism.

Accordingly, the center of gravity of the vehicle as well as that of the whole engine can be lowered. Further, in the case where the clutch actuators control a hydraulic pressure supplied to the clutch mechanism, these are arranged closer to an oil pump inside the engine case on the lower side. Accordingly, oil passages between the oil pump and the clutch actuators can be shortened.

According to another aspect of the present invention, the engine includes clutch actuators, wherein the clutch actuators are arranged, behind the clutch mechanism, between a pair of left and right pivot plates (for example, pivot plates 8 in the embodiments) for swingably supporting a front end of a swing arm (for example, a swing arm 9 in the embodiments) to which the drive wheel is journaled and above a front end of the swing arm.

Accordingly, a space formed between the left and right pivot plates and above a front end of the swing arm can be effectively used as an arrangement space for the clutch actuators.

According to another aspect of the present invention, the engine includes clutch actuators, wherein the clutch actuators are arranged between a cam chain (for example, a cam chain 103 in the embodiments) wound between the crankshaft and cam shafts (for example, cam shafts 101 and 102 in the embodiments), and the clutch mechanism.

Accordingly, a space formed between the clutch mechanism and the cam chain can be effectively used as an arrangement space for the clutch actuators.

BRIEF DESCRIPTION OF THE DRAWINGS

A preferred embodiment of the present invention will be described with reference to the accompanying drawings, wherein.

DETAILED DESCRIPTION OF THE INVENTION

Figure 1:
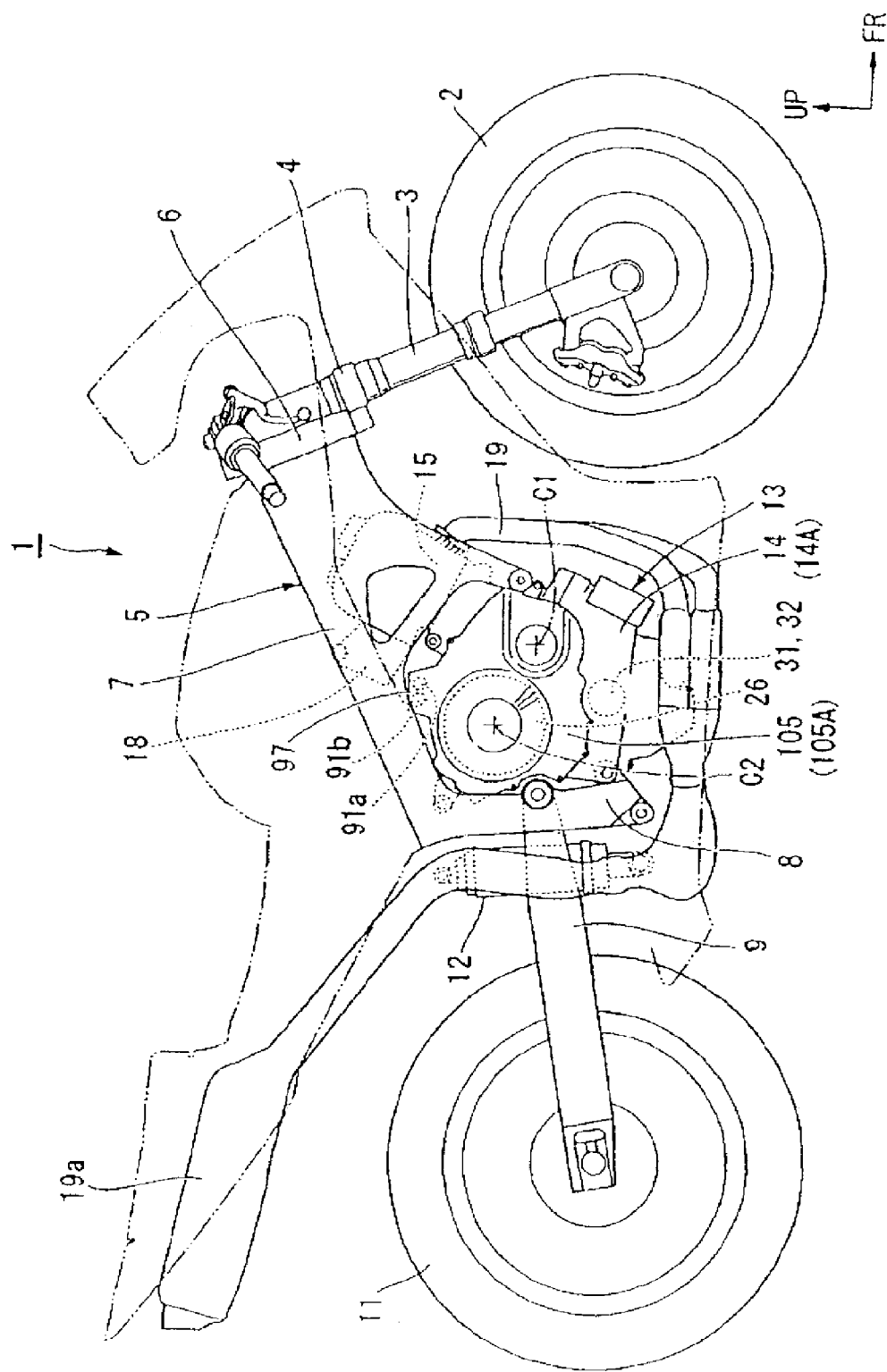
FIG. 1 is a right side view of a motorcycle in an embodiment of the present invention.

Embodiments of the present invention will be described with reference to the drawings. It should be noted that the directions of front, rear, left, right, and the like in the following description are the same as those of a vehicle unless otherwise described. Further, arrows FR, LH, and UP in the drawings indicate the front, left, and upper of the vehicle, respectively.

As shown in FIG. 1, an upper portion of a front fork 3 to which a front wheel 2 of a motorcycle (saddle-ride type vehicle) 1 is journaled is steerably supported by a head pipe 6 located at a front end of a body frame 5, through a steering stem 4. A main frame 7 extends rearward from the head pipe 6 to be continued to pivot plates 8. A front end of a swing arm 9 is supported by the pivot plates 8 in a vertically swingable manner, and a rear wheel 11 is journaled to a rear end of the swing arm 9. A cushion unit 12 is interposed between the swing arm 9 and the body frame 5. An engine (internal combustion engine) 13 as a power plant of the motorcycle 1 is arranged below the main frame 7.

Figure 2:
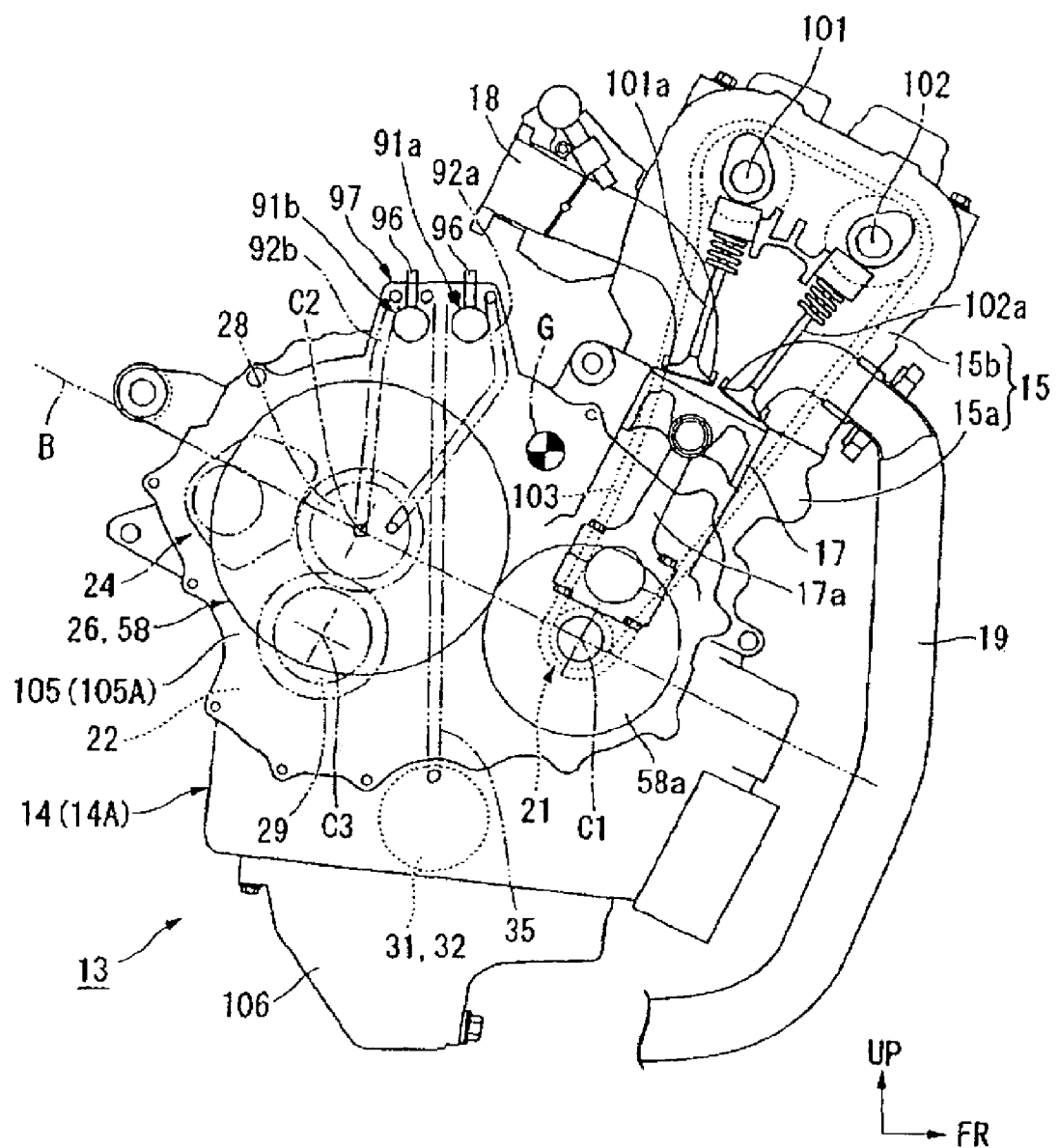
FIG. 2 is a right side view of an engine of the motorcycle.

With reference to FIG. 2 together, the engine 13 is an in-line four-cylinder engine in which a crankshaft axis line (a rotational center axis line of a crankshaft 21) C1 is directed in the vehicle-width direction (the left-right direction), and a cylinder part 15 is provided on a crankcase 14 in an erect manner. The cylinder part 15 includes a cylinder 15*a* which is provided integrally with the crankcase 14, and a cylinder head 15*b* which is attached on the cylinder 15*a*. It should be noted that the reference letter G denotes the center of gravity of the engine, viewed from the lateral side of the engine.

A piston 17 is fitted into the cylinder 15*a*, and reciprocating motions of the piston 17 are converted into rotational motions of the crankshaft 21 through a connecting rod 17*a*. The rotational drive power of the crankshaft 21 is input to a twin-clutch transmission 23, to be described later, and then is transmitted to the rear wheel 11 from the rear left side of the crankcase 14 through, for example, a chain-drive-type power transmission mechanism.

In the cylinder head 15*b*, there is provided a valve mechanism composed mainly of intake and exhaust cam shafts 101 and 102 in parallel with the crankshaft 21, and intake and exhaust valves 101*a* and 102*a* corresponding to the respective cam shafts. A cam chain 103 is wound between right ends of the respective cam shafts 101 and 102, and a right end of the crankshaft 21.

A throttle body 18 corresponding to each cylinder is connected to a rear portion of the cylinder head 15*b*, and an exhaust pipe 19 corresponding to each cylinder is connected to a front portion of the cylinder head 15*b*. The respective exhaust pipes 19 are arranged below the crankcase 14 while being appropriately bent, and are assembled to one pipe, which then extends, for example, upward to be connected to a silencer 19*a* located on the upper side of a rear portion of the vehicle body (see FIG. 1).

The engine 13 has a structure in which the transmission part is provided integrally therewith, and a transmission case 22 for accommodating therein the twin-clutch transmission 23, to be described later, and a change mechanism 24 for shifting a speed-change gear of the twin-clutch transmission 23 is configured at a rear portion of the crankcase 14. Specifically, the cylinder 15a and the transmission case 22 are integrally formed in the crankcase 14. A clutch cover 105 protruding rightward from a right face of the crankcase 14 is attached to the right face, and an oil pan 106 protruding downward from a lower face of the crankcase 14 is attached to the lower face. An assembly of the crankcase 14, the clutch cover 105, the oil pan 106, and the like is referred to as an engine case 14A.

A twin clutch 26 of the twin-clutch transmission 23 is located on the right rear side relative to the crankshaft 21. An ignition timing plate (not shown) is provided at a right end of the crankshaft 21, and the clutch cover 105 is provided so as to cover the twin clutch 26 together with the crankshaft 21 and the ignition timing plate. The clutch cover 105, together with a right portion of the crankcase 14, configures a clutch case 105A for accommodating therein the twin clutch 26 and the like.

In the engine 13, three main shafts, namely, the crankshaft 21, a main shaft 28 and a counter shaft 29 in parallel with the crankshaft 21 in the twin-clutch transmission 23 are arranged while forming a triangle. Specifically, the axis lines C1 and C2 of the crankshaft 21 and the main shaft 28 are arranged on an up/down dividing plane B which is inclined upward to the rear in the crankcase 14, and the axis line C3 of the counter shaft 29 is arranged below the dividing plane B and behind the crankshaft 21. The change mechanism 24 is arranged behind the main shaft 28.

Figure 3:
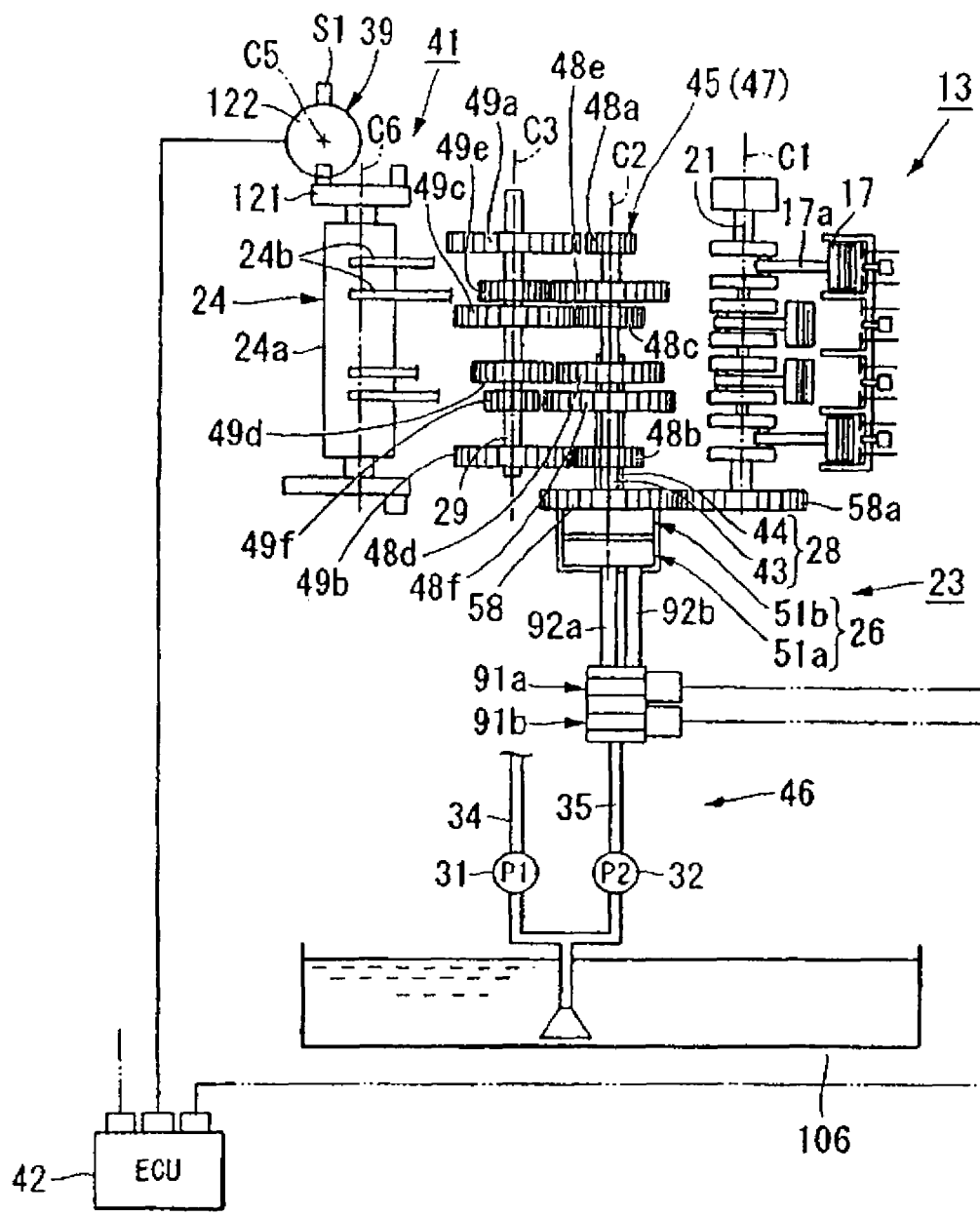
FIG. 3 is a configuration view of a twin-clutch transmission of the engine.

As shown in FIG. 3, the motorcycle 1 includes an automatic transmission system composed mainly of the twin-clutch transmission 23 continued to the engine 13, a gear shift apparatus 41 configured by providing a drive mechanism 39 in the change mechanism 24, and an electronic control unit (ECU) 42 for operating and controlling the twin-clutch transmission 23 and the gear shift apparatus 41.

The twin-clutch transmission 23 has the main shaft 28 of a double structure composed of inner and outer shafts 43 and 44, the counter shaft 29 which is arranged in parallel with the main shaft 28, a speed-change gear group 45 which is arranged across the main shaft 28 and the counter shaft 29, the twin clutch 26 which is coaxially arranged at a right end of the main shaft 28, and a hydraulic pressure supplying apparatus 46 which supplies a hydraulic pressure for operating the twin clutch 26 to the twin clutch 26. Hereinafter, an assembly composed of the main shaft 28, the counter shaft 29, and the speed-change gear group 45 is referred to as a transmission 47.

The main shaft 28 is configured in such a manner that a right side portion of the inner shaft 43 is inserted into the relatively-short outer shaft 44 in a relatively-rotatable manner. At the outer circumference of the inner and outer shafts 43 and 44, drive gears 48a to 48f of six speeds in the speed-change gear group 45 are sorted and arranged. On the other hand, at the outer circumference of the counter shaft 29, driven gears 49a to 49f of six speeds in the speed-change gear group 45 are arranged. The corresponding speed-change gears among the drive gears 48a to 48f and the driven gears 49a to 49f are meshed with each other to configure pairs of speed-change gears corresponding to the respective speeds.

The twin clutch 26 has first and second disc clutches (hereinafter, referred to simply as clutches in some cases) 51a and 51b of a hydraulic type which are coaxially arranged while being adjacent to each other, and the inner and outer shafts 43 and 44 are coaxially coupled to the respective clutches 51a and 51b. A primary driven gear 58 which is meshed with a primary drive gear 58a of the crankshaft 21 is coaxially coupled to a clutch outer 56 (see FIG. 4) shared by the clutches 51a and 51b, and the rotational drive power of the crankshaft 21 is input to the respective clutches 51a and 51b through the respective gears 58 and 58a. The power transmission in the respective clutches 51a and 51b can be individually connected or disconnected depending on whether or not a hydraulic pressure is supplied from the hydraulic pressure supplying apparatus 46.

The hydraulic pressure supplying apparatus 46 is composed mainly of first and second oil pumps 31 and 32 which are coaxially arranged inside the crankcase 14 on the lower side, a main oil-feeding-passage 34 which extends from a discharge port of the first oil pump 31, an oil feeding passage 35 which extends from a discharge port of the second oil pump 32, first and second clutch actuators 91a and 91b to which the downstream side of the oil feeding passage 35 is connected, and first and second oil-supplying passage 92a and 92b which respectively extend from the clutch actuators 91a and 91b to clutch-connection hydraulic chambers 54a and 54b (see FIG. 4) of the clutches 51a and 51b.

The first oil pump 31 is used for supplying a hydraulic pressure to respective portions of the engine 13, and the discharge port thereof is connected to a main oil gallery (not shown) through the main oil-feeding-passage 34. On the other hand, the second oil pump 32 serves as a hydraulic pressure generating source for operating the twin clutch 26, and the discharge port thereof is connected to the oil feeding passage 35 for the twin clutch 26.

The oil feeding passage 35 can be individually in communication with the first oil-supplying passage 92a or second oil-supplying passage 92b by operating the respective clutch actuators 91a and 91b. When the oil feeding passage 35 is in communication with the first oil-supplying passage 92a, a relatively-high hydraulic pressure from the second oil pump 32 is supplied to the clutch-connection hydraulic chamber 54a of the first clutch 51a through the first oil-supplying passage 92a, and the first clutch 51a is switched from a disconnected state to a connected state. On the other hand, when the oil feeding passage 35 is in communication with the second oil-supplying passage 92b, a hydraulic pressure from the second oil pump 32 is supplied to the clutch-connection hydraulic chamber 54b of the second clutch 51b through the second oil-supplying passage 92b, and the second clutch 51b is switched from a disconnected state to a connected state.

The change mechanism 24 allows a plurality of shift forks 24b to be moved by rotating a shift drum 24a arranged in parallel with the respective shafts 28 and 29, so as to switch a pair of speed-change gears used for power transmission to the counter shaft 29. The drive mechanism 39 is arranged at a left end of the shift drum 24a. It should be noted that the reference numeral S1 in the drawing denotes a sensor for detecting an operation amount of the drive mechanism 39 in order to detect a speed-change gear of the transmission 47.

The electronic control unit (ECU) 42 operates and controls the twin-clutch transmission 23 and the gear shift apparatus 41 on the basis of information and the like from the respective sensors so as to shift a speed-change gear (shift position) of the transmission 47.

By connecting one of the clutches 51a and 51b and disconnecting the other one, power transmission is performed using any pair of speed-change gears to be coupled to one of the inner and outer shafts 43 and 44. Then, one of the pairs of speed-change gears which is to be coupled to the other of the inner and outer shafts 43 and 44 is preliminarily selected for use next time, and from this state, one of the clutches 51a and 51b is disconnected and the other one is connected. Accordingly, power transmission is switched to one using the preliminarily-selected pair of speed-change gears, and thus upshift or downshift of the transmission 47 is carried out.

The transmission 47 is of a constant-mesh type in which the drive gears 48a to 48f and the driven gears 49a to 49f corresponding to the respective speeds are constantly meshed with each other. Each gear is roughly classified into a free gear which is rotatable relative to a shaft and a slide gear which is spline-fitted to a shaft in a relatively-nonrotatable manner. An arbitrary slide gear is appropriately slid by the change mechanism 24, so that power transmission using a pair of speed-change gears corresponding to any speed can be performed.

Figure 4:
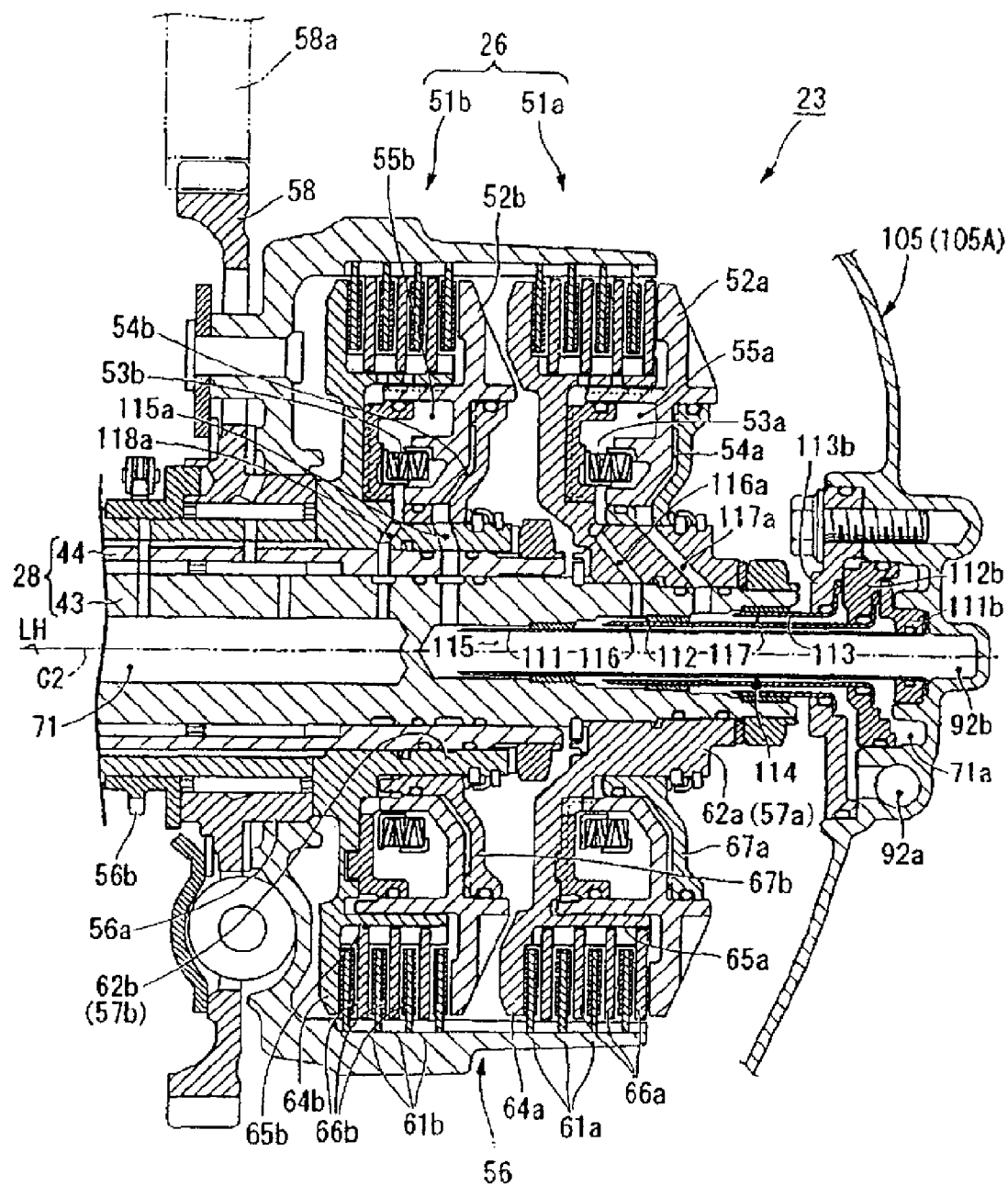
FIG. 4 is a cross sectional view of a twin clutch of the twin-clutch transmission.
Figure 5:
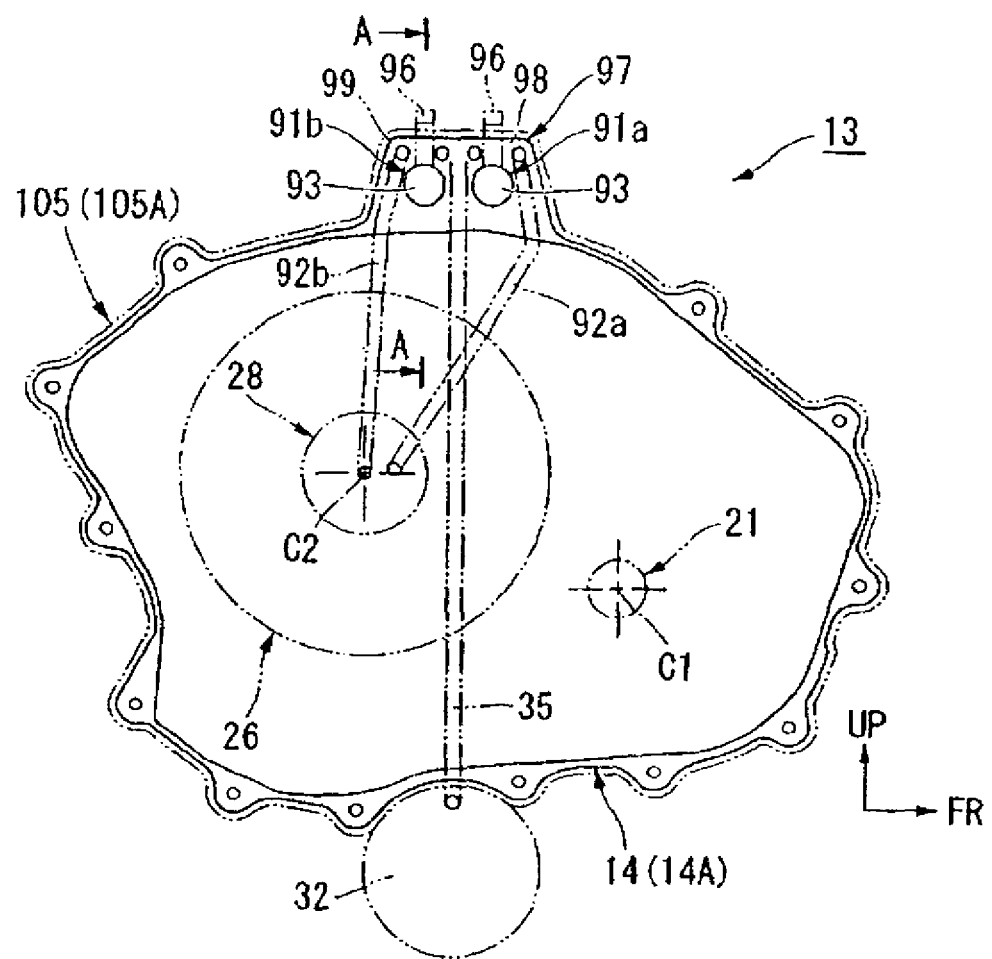
FIG. 5 is a right side view of a clutch case of the engine.

As shown in FIG. 4, the twin clutch 26 is configured in such a manner that the first clutch 51a for uneven-numbered gears is arranged on the right side in the clutch case 105A (outside in the engine case 14A) and the second clutch 51b for even-numbered gears is arranged on the left side therein (inside in the engine case 14A). The clutches 51a and 51b are wet-type multiple disc clutches, each having a plurality of clutch discs which overlap with each other in the axis direction.

The respective clutches 51a and 51b are of a hydraulic type in which pressure plates 52a and 52b are displaced in the axis direction by a hydraulic pressure supplied from outside so as to exercise a predetermined engaging force. The clutches 51a and 51b include unfastening springs 53a and 53b which urge the pressure plates 52a and 52b to the side where the clutches are disconnected, the clutch-connection hydraulic chambers 54a and 54b which apply a pressing force toward where the clutches are connected, to the pressure plates 52a and 52b, and clutch-disconnection hydraulic chambers 55a and 55b which apply a pressing force toward where the clutches are disconnected, to the pressure plates 52a and 52b, respectively. A relatively-low hydraulic pressure from the first oil pump 31 constantly acts on the clutch-disconnection hydraulic chambers 55a and 55b. On the other hand, a relatively-high hydraulic pressure from the second oil pump 32 can be supplied to the clutch-connection hydraulic chambers 54a and 54b.

The respective clutches 51a and 51b are configured in such a manner that they share the single clutch outer 56 and have the same diameter. The clutch outer 56 is formed in a cylindrical shape with a bottom and is open to the right. A clutch center 57a for the first clutch 51a is arranged on the right side inside the clutch outer 56 and a clutch center 57b for the second clutch 51b is arranged on the left side inside the clutch outer 56. The clutch center 57a is supported at a right end of the inner shaft 43 in a relatively-nonrotatable manner, and the clutch center 57b is supported at a right end of the outer shaft 44 in a relatively-nonrotatable manner.

The primary driven gear 58 is coupled to a bottom portion located on the left side of the clutch outer 56 through a spring damper, and the primary drive gear 58a of the crankshaft 21 is meshed with the primary driven gear 58. The clutch outer 56 is driven from the primary driven gear 58 through the spring damper. A drive sprocket 56b for driving the respective oil pumps 31 and 32 is provided at a hub part 56a of the clutch outer 56 in an integrally-rotatable manner. A plurality of clutch plates 61a for the first clutch 51a are supported on the right side of the inner circumference of an outer wall of the clutch outer 56 in a relatively-nonrotatable manner. A plurality of clutch plates 61b for the second clutch 51b are supported on the left side of the inner circumference of the outer wall of the clutch outer 56 in a relatively-nonrotatable manner.

An inner wall 65a is provided in a protruding manner at a flange part 64a on the left side of the clutch center 57a of the first clutch 51a, and a plurality of clutch discs 66a are supported at the outer circumference of the inner wall 65a in a relatively-nonrotatable manner. The clutch discs 66a and the clutch plates 61a are arranged so as to overlap with each other in the clutch axis direction.

The pressure plate 52a is arranged on the right side relative to the flange part 64a while being opposed thereto. Between the outer circumferential side of the pressure plate 52a and the outer circumferential side of the flange part 64a, there are arranged the clutch plates 61a and the clutch discs 66a in a laminated manner.

Between the inner circumferential side of the pressure plate 52a and the inner circumferential side of the flange part 64a, there is formed the clutch-disconnection hydraulic chamber 55a, and there is arranged the return spring 53a which urges the pressure plate 52a toward the right (toward the side apart from the flange part 64a, or toward where the clutches are disconnected).

A support flange part 67a which is integrally provided at the outer circumference of a middle cylinder part 62a on the right side of the clutch center 57a is arranged on the right side relative to the inner circumferential side of the pressure plate 52a while being opposed thereto. Between the support flange part 67a and the inner circumferential side of the pressure plate 52a, there is formed the clutch-connection hydraulic chamber 54a.

An inner wall 65b is provided in a protruding manner at a flange part 64b on the left side of the clutch center 57b of the second clutch 51b, and a plurality of clutch discs 66b are supported at the outer circumference of the inner wall 65b in a relatively-nonrotatable manner. The clutch discs 66b and the clutch plates 61b are arranged so as to overlap with each other in the clutch axis direction.

The pressure plate 52b is arranged on the right side relative to the flange part 64b while being opposed thereto. Between the outer circumferential side of the pressure plate 52b and the outer circumferential side of the flange part 64b, there are arranged the clutch plates 61b and the clutch discs 66b in a laminated manner.

Between the inner circumferential side of the pressure plate 52b and the inner circumferential side of the flange part 64b, there is formed the clutch-disconnection hydraulic chamber 55b, and there is arranged the return spring 53b which urges the pressure plate 52b toward the right (toward the side apart from the flange part 64b, or toward where the clutches are disconnected).

A support flange part 67b which is integrally provided at the outer circumference of a middle cylinder part 62b on the right side of the clutch center 57b is arranged on the right side relative to the inner circumferential side of the pressure plate 52b while being opposed thereto. Between the support flange part 67b and the inner circumferential side of the pressure plate 52b, there is formed the clutch-connection hydraulic chamber 54b.

In a state where the engine is stopped (in a state where the respective oil pumps 31 and 32 are stopped), the clutches 51a and 51b are put in a clutch-disconnected state in which the pressure plates 52a and 52b are displaced toward the right by the urging force of the return springs 53a and 53b, and the friction engagement between the clutch plates 61a and 61b and the clutch discs 66a and 66b is released, respectively. Even in a state where the engine is operated and the supply of a hydraulic pressure from the hydraulic pressure supplying apparatus 46 is stopped, the urging force of the return springs 53a and 53b and the hydraulic pressure of the clutch-disconnection hydraulic chamber 55a and 55b act on the pressure plates 52a and 52b, so that the clutch 51a and 51b are put in a clutch-disconnected state, as similar to the above.

On the other hand, in a state where the engine is operated and a relatively-high hydraulic pressure is supplied from the hydraulic pressure supplying apparatus 46 to the clutch-connection hydraulic chamber 54a, the pressure plate 52a is displaced toward the left (toward the flange part 64a-side, or toward where the clutches are connected) against the hydraulic pressure of the clutch-disconnection hydraulic chamber 55a and the urging force of the return spring 53a, and the clutch plates 61a and the clutch discs 66a are sandwiched and pressed for the friction engagement, so that the first clutch 51a is put in a clutch-connected state where torque transmission can be performed between the clutch outer 56 and the clutch center 57a.

As similar to the above, in a state where the engine is operated and a relatively-high hydraulic pressure is supplied from the hydraulic pressure supplying apparatus 46 to the clutch-connection hydraulic chamber 54b, the pressure plate 52b is displaced toward the left (toward the flange part 64a-side, or toward where the clutches are connected) against the hydraulic pressure of the clutch-disconnection hydraulic chamber 55b and the urging force of the return spring 53b, and the clutch plates 61b and the clutch discs 66b are sandwiched and pressed for the friction engagement, so that the second clutch 51b is put in a clutch-connected state where torque transmission can be performed between the clutch outer 56 and the clutch center 57b.

When the supply of a hydraulic pressure to the clutch-connection hydraulic chamber 54a and 54b is stopped in the clutch-connected state of the clutches 51a an 51b, the pressure plates 52a and 52b are displaced toward the left by the hydraulic pressure of the clutch-disconnection hydraulic chambers 55a and 55b and the urging force of the return springs 53a and 53b, and the friction engagement between the clutch plates 61a and 61b and the clutch discs 66a and 66b is released, respectively, so that the clutches 51a and 51b are put in a clutch-disconnected state where torque transmission can not be performed between the clutch outer 56 and the clutch centers 57a and 57b.

Inside the clutch cover 105, there are provided first, second, and third pipes 111, 112, and 113 across the clutch cover 105 and a right end of the main shaft 28 (the inner shaft 43). The pipes 111, 112, and 113 are arranged coaxially with the main shaft 28, and are arranged in the order of the first, second, and third pipes from the inner circumferential side so as to overlap with each other with predetermined gaps.

Inside a right portion of the inner shaft 43, there is formed a right hollow part 114 whose diameter is increased in roughly three steps toward the right. The right hollow part 114 is separated, through a division wall, from a main oil-supplying passage 71 which ranges from a left-end opening in the inner shaft 43 to a position corresponding to the vicinity of the second clutch 51b, and the pipes 111, 112, and 113 are inserted, from their left portions, into the right hollow part 114 from its right-end opening.

The outer circumference on the left side of the first pipe 111 is oil-tightly held at the inner circumference on the left side of the right hollow part 114, the outer circumference on the left side of the second pipe 112 is oil-tightly held at the inner circumference of an intermediate portion of the right hollow part 114, and the outer circumference on the left side of the third pipe 113 is oil-tightly held at the inner circumference on the right side of the right hollow part 114.

Right ends of the pipes 111, 112, and 113 are oil-tightly inserted into and held in circular holders 111b, 112b, and 113b, respectively. The holders 111b, 112b, and 113b are fixed, inside the case, to an outer wall of the clutch cover 105 in a state where the holders 111b, 112b, and 113b hold right ends of the pipes 111, 112, and 113.

A space inside the first pipe 111 and circular spaces formed between the respective pipes 111, 112, and 113 configure a plurality of inter-shaft oil passages 115, 116, and 117 which coaxially overlap with each other inside the main shaft 28.

Specifically, the space inside the first pipe 111 functions as a first inter-shaft oil passage 115, a right end of which is in communication with the second oil-supplying passage 92b formed inside the clutch cover 105, and a left end of which is in communication with the clutch-connection hydraulic chamber 54b of the second clutch 51b through a clutch-connection oil passage 115a which penetrates the inner and outer shafts 43 and 44 and the clutch center 57b.

The space between the first pipe 111 and the second pipe 112 functions as a second inter-shaft oil passage 116, a right end of which is in communication with an inter-cover main oil-supplying passage 71a formed inside the clutch cover 105, and a left end of which is in communication with the clutch-disconnection hydraulic chamber 55a of the first clutch 51a through a clutch-disconnection oil passage 116a which penetrates the inner shaft 43 and the clutch center 57a.

Further, the space between the second pipe 112 and the third pipe 113 functions as a third inter-shaft oil passage 117, a right end of which is in communication with the first oil-supplying passage 92a formed inside the clutch cover 105, and a left end of which is in communication with the clutch-disconnection hydraulic chamber 54a of the first clutch 51a through a clutch-connection oil passage 117a which penetrates the inner shaft 43 and the clutch center 57a.

A right end of the main oil-supplying passage 71 inside the inner shaft 43 is in communication with the clutch-disconnection hydraulic chamber 55b of the second clutch 51b through a clutch-disconnection oil passage 118a which penetrates the inner and outer shafts 43 and 44 and the clutch center 57b. A relatively-low hydraulic pressure from the first pump 31 is supplied to the clutch-disconnection hydraulic chamber 55b of the second clutch 51b through the main oil-supplying passage 71 and the clutch-disconnection oil passage 118a. Further, a relatively-low hydraulic pressure from the first pump 31 is supplied to the clutch-disconnection hydraulic chamber 55a of the first clutch 51a through the inter-cover main oil-supplying passage 71a, the second inter-shaft oil passage 116, and the clutch-disconnection oil passage 116a.

When the oil feeding passage 35 and the first oil-supplying passage 92a are in communication with each other by actuation of the first clutch actuator 91a, a relatively-high hydraulic pressure from the second oil pump 32 is supplied to the clutch-connection hydraulic chamber 54a of the first clutch 51a through the first oil-supplying passage 92a, the third inter-shaft oil passage 117, and the clutch-connection oil passage 117a. Further, when the oil feeding passage 35 and the second oil-supplying passage 92b are in communication with each other by actuation of the second clutch actuator 91b, a relatively-high hydraulic pressure from the second oil pump 32 is supplied to the clutch-connection hydraulic chamber 54b of the second clutch 51b through the second oil-supplying passage 92b, the first inter-shaft oil passage 115, and the clutch-connection oil passage 115a.

Figure 6:
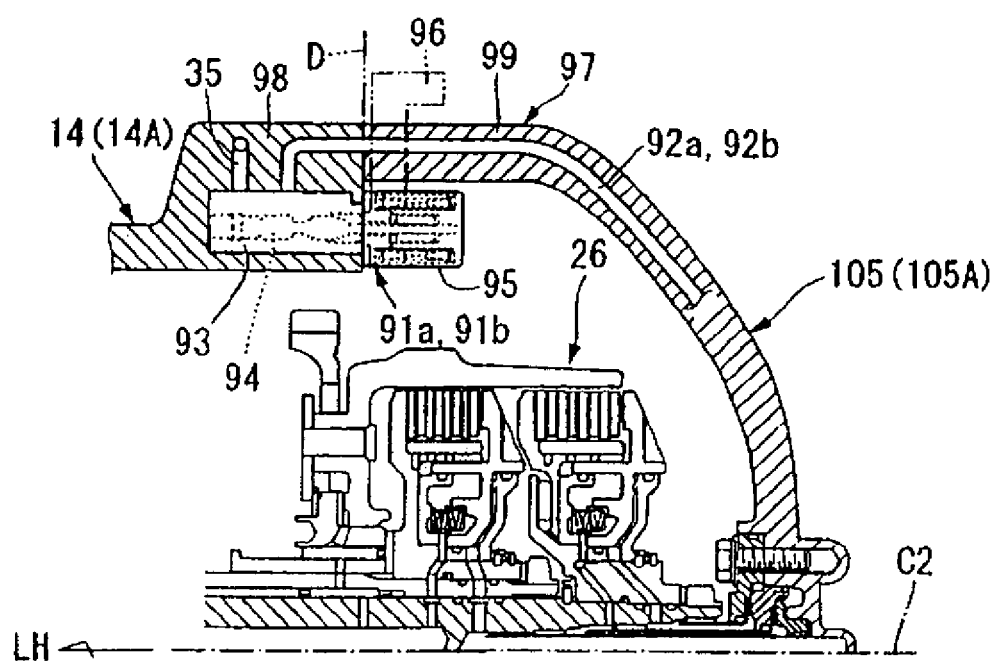
FIG. 6 is a cross sectional view taken along the line A-A of FIG. 5.
Figure 7:
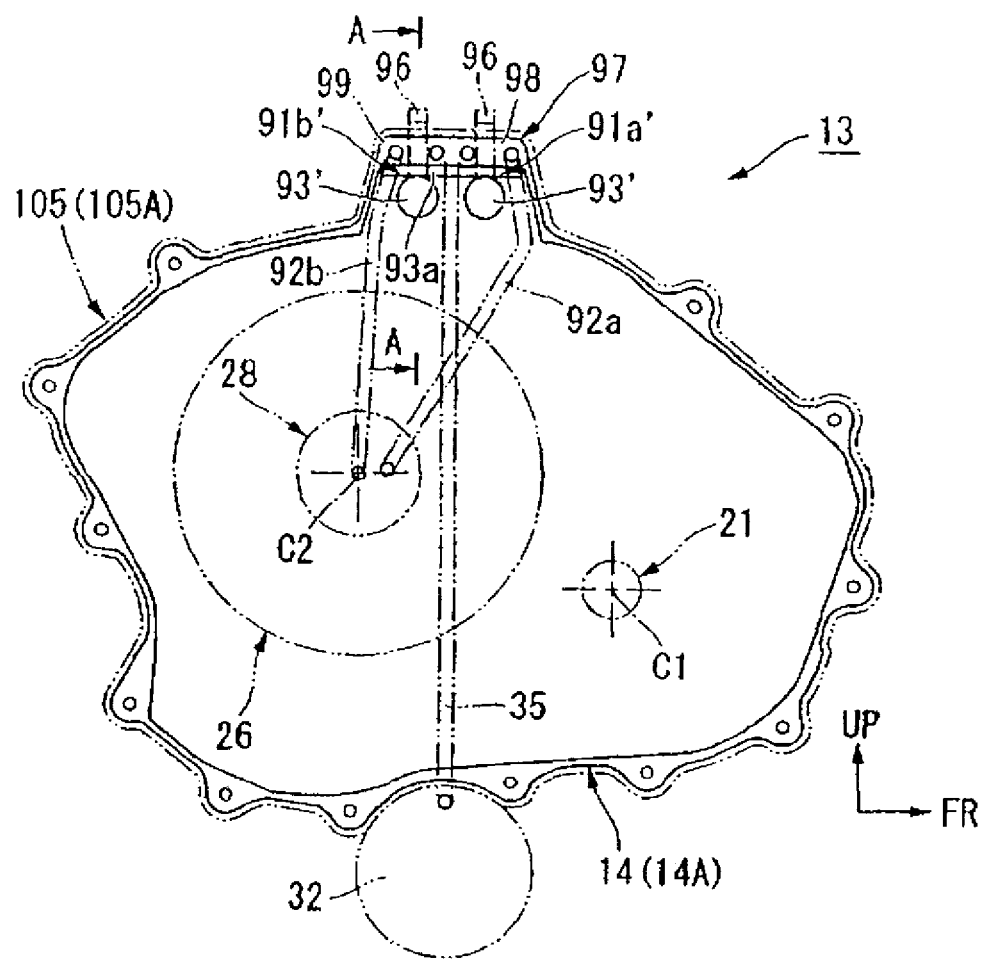
FIG. 7 is a right side view showing a modified example of the embodiment, corresponding to FIG. 5.

As shown in FIGS. 6 and 7, each of the clutch actuators 91a and 91b includes a cylinder 93 to which the oil feeding passage 35 and the first or second oil-supplying passage 92a or 92b are connected, a piston 94 which is operated inside the corresponding cylinder 93 to switch communication states of the respective oil passages 35, 92a, and 92b, and a linear solenoid 95 which controls the operation of the corresponding piston 94. Each of the linear solenoids 95 is driven and controlled by the ECU 42, and is substantially coaxially connected to one end of the corresponding cylinder 93.

The respective clutch actuators 91a and 91b are arranged inside an actuator installing part 97 located at an upper portion (above the twin clutch 26) of the clutch case 105A in a state where the axis lines thereof are directed in the left-right direction and they are arranged in parallel with each other and in, for example, a vertically aligned manner. In other words, the respective clutch actuators 91a and 91b are arranged around the twin-clutch 26, viewed from the lateral side of the engine (viewed from the crankshaft direction, or viewed from the arrow direction along the axis line C1) (in other words, on a projection view on a plane orthogonal to the crankshaft (the axis line C1)).

The actuator installing part 97 protrudes upward (outside the clutch case 105A) at an upper portion of the clutch case 105A, and allows the respective clutch actuators 91a and 91b to be arranged inside the clutch case 105A while preventing the respective clutch actuators 91a and 91b from protruding into a clutch arrangement space inside the clutch case 105A.

The actuator installing part 97 is provided across the crankcase 14-side and the clutch cover 105-side in the left-right direction, so that the actuator installing part 97 is divided by the boundary of a mating face D. Hereinafter, a region nearer the crankcase 14 and a region nearer the clutch cover 105 in the actuator installing part 97 are referred to as a case-side half body 98 and a cover-side half body 99, respectively.

The respective clutch actuators 91a and 91b are arranged in such a manner that the cylinders 93 are arranged on the left side (the crankcase 14-side corresponding to the inside in the engine case 14A) and the linear solenoids 95 are arranged on the right side (the clutch cover 105-side corresponding to the outside in the engine case 14A) with the mating face D as the boundary.

The cylinders 93 of the clutch actuators 91a and 91b are formed integrally with an outer wall of the case-side half body 98 of the actuator installing part 97. The respective cylinders 93 are open toward the clutch cover 105-side at the boundary of the mating face D, and the pistons 94 can be inserted into the cylinders 93 and the linear solenoids 95 can be attached prior to attachment of the clutch cover 105 to the crankcase 14.

The clutch actuators 91a and 91b can be arranged while being replaced with each other. In this case, the cylinders 93 can be formed integrally with the clutch cover 105.

The oil feeding passage 35 and the respective oil-supplying passages 92a and 92b which are formed inside the clutch cover 105 extend across the mating face D) inside the outer wall of the case-side half body 98 of the actuator installing part 97, and are directly connected to the cylinders 93. Specifically, there is no need of position adjustment between the respective oil passages 35, 92a, and 92b, and the cylinders 93, as compared to a case where the cylinders 93 are provided separately from the engine case 14A. Thus, the number of steps for attaching the respective clutch actuators 91a and 91b is decreased, and the accuracy management is facilitated, so that the cost can be reduced.

The oil feeding passage 35 extends substantially upright to the above from a discharge port of the second oil pump 32 inside the crankcase 14 on the lower side, viewed from the lateral side of the engine, and reaches the respective clutch actuators 91a and 91b inside the actuator installing part 97. Specifically, the actuator installing part 97 and the respective clutch actuators 91a and 91b are positioned substantially right above the second oil pump 32, viewed from the lateral side of the engine. Thereby, the length of the oil feeding passage 35 is suppressed to the minimum, so that the hydraulic pathways are simplified and downsized.

The respective clutch actuators 91a and 91b are supported by the actuator installing part 97 (the case-side half body 98) through the cylinders 93, and the linear solenoids 95 are not directly supported by the actuator installing part 97 (the cover-side half body 99). In other words, the respective clutch actuators 91a and 91b are supported by the crankcase 14 in the actuator installing part 97.

Couplers 96 for connecting electric power supplying harnesses in the linear solenoids 95 are pulled out from notches formed on the outer wall of the cover-side half body 99 of the actuator installing part 97. A base part of each coupler 96 is fitted into the notch through a seal member, and the crankcase 14 and the clutch cover 105 are coupled to each other in this state. Accordingly, the base part of each coupler 96 is sandwiched between the crankcase 14 and the clutch cover 105 in a sealed state. Specifically, it is possible to easily realize the formation of the coupler pulled-out portions and the seal structure therefor in the engine case 14A.

As described above, the engine 13 of the embodiment includes: the twin clutch 26 which is provided in the power transmission pathway through which a rotational drive power of the crankshaft 21 is transmitted to the drive wheel (the rear wheel 11) and which connects or disconnects the transmission of the rotational drive power of the crankshaft 21 to the drive wheel-side; the engine case 14A in which the twin clutch 26 and the crankshaft 21 are accommodated; and the clutch actuators 91a and 91b which control a connecting/disconnecting operation of the twin clutch 26. In the engine 13, the clutch actuators 91a and 91b are arranged around the twin clutch 26, viewed from the crankshaft direction, and inside the engine case 14A.

According to the configuration, the outer wall of the engine case 14A can be used as a cover for the respective clutch actuators 91a and 91b. Accordingly, it is not necessary to provide an additional cover, and it is possible to reduce the weight and cost by suppressing an increase in the number of components. In addition, the respective clutch actuators 91a and 91b can be closer to the twin clutch 26. Accordingly, it is possible to simplify and downsize interconnected means (hydraulic pathways) provided therebetween.

Further, in the engine 13, the engine case 14A has the crankcase 14 for rotatably supporting the crankshaft 21, and the respective clutch actuators 91a and 91b are provided in the crankcase 14. Accordingly, the respective clutch actuators 91a and 91b can be supported by the crankcase 14 with a relatively-high rigidity. Thus, there is no need of providing an additional supporting structure for the clutch actuators 91a and 91b, and it is possible to simplify the engine case structure.

In addition, in the engine 13, the engine case 14A has the clutch cover 105 which forms the clutch case 105A that is coupled to the crankcase 14 to, together with the crankcase, accommodate the twin clutch 26. The respective clutch actuators 91a and 91b are provided inside the clutch case 105A, so that the respective clutch actuators 91a and 91b, and the twin clutch 26 can be arranged closer to each other. Accordingly, it is possible to further simplify and downsize interconnected means provided therebetween.

In addition, in the engine 13, the connecting/disconnecting operation of the twin clutch 26 is controlled by a hydraulic pressure supplied through the respective clutch actuators 91a and 91b. The clutch actuators 91a and 91b include the cylinders 93 to which a plurality of oil passages 35, 92a and 92b are connected, the pistons 94 which are operated inside the cylinders 93 to switch communication states of the respective oil passages 35, 92a, and 92b, and the linear solenoids 95 which control the operation of the pistons 94. The cylinders 93 are provided integrally with the engine case 14A, so that assembling of the respective clutch actuators 91a and 91b, and attaching of the respective clutch actuators 91a and 91b to the engine case 14A can be performed only by inserting the pistons 94 into the cylinders 93 and by attaching the linear solenoids 95. Thus, it is possible to facilitate the assembling and attaching work.

In addition, in the engine 13, the respective clutch actuators 91a and 91b are arranged above the twin clutch 26. Accordingly, it is possible to shorten the electric power supplying harnesses, which extend from upper portions of the vehicle, for the respective clutch actuators 91a and 91b, and to facilitate the connecting work.

Figure 8:
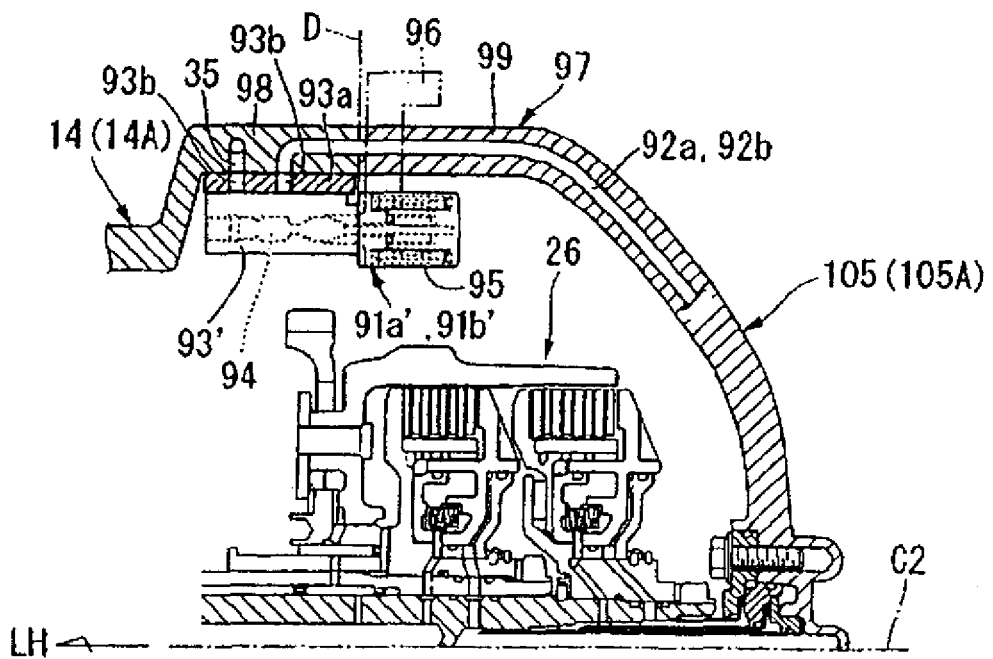
FIG. 8 is a cross sectional view taken along the line A-A of FIG. 7.

As shown in FIGS. 7 and 8, a configuration in which clutch actuators 91a' and 91b' having cylinders 93, provided separately from the engine case 14A are employed in place of the clutch actuators 91a and 91b may be adapted.

The cylinders 93' of the clutch actuators 91a' and 91b' are fixed on a base member 93a in, for example, a flat shape so as to be aligned in parallel with each other. For example, the base member 93a is fixed, from the inside of the case, to the outer wall of the case-side half body 98 of the actuator installing part 97 with bolts or the like, and thus the respective clutch actuators 91a' and 91b' are supported inside the clutch case 105A in an arrangement similar to the above embodiment. A communication passage 93b through which the respective oil passages 35, 92a, and 92b that extend inside the outer wall of the actuator installing part 97 are in communication with the respective cylinders 93' is formed in the base member 93a.

Even in the above-described modified example, the respective clutch actuators 91a' and 91b' are arranged around the twin clutch 26, viewed from the crankshaft direction, and inside the engine case 14A. Accordingly, a part of the engine case 14A can be used as a cover for the respective clutch actuators 91a' and 91b', and it is possible to simplify and downsize interconnected means provided between the twin clutch 26 and the clutch actuators 91a' and 91b'.

Especially in the case where the twin clutch 26 and the clutch actuators 91a' and 91b' are interconnected with each other through hydraulic pathways, if the respective clutch actuators 91a' and 91b' are provided outside the engine case 14A, high sealing performance is required in a region (where the hydraulic pathways cross over the engine case 14A) where the clutch actuators 91a' and 91b' are attached to the engine case 14A. However, by providing the clutch actuators 91a' and 91b' inside the engine case 14A, high sealing performance is not required in the region to which the clutch actuators 91a' and 91b' are attached, and thus it is possible to improve the attachability of the clutch actuators 91a' and 91b'.

Figure 9:
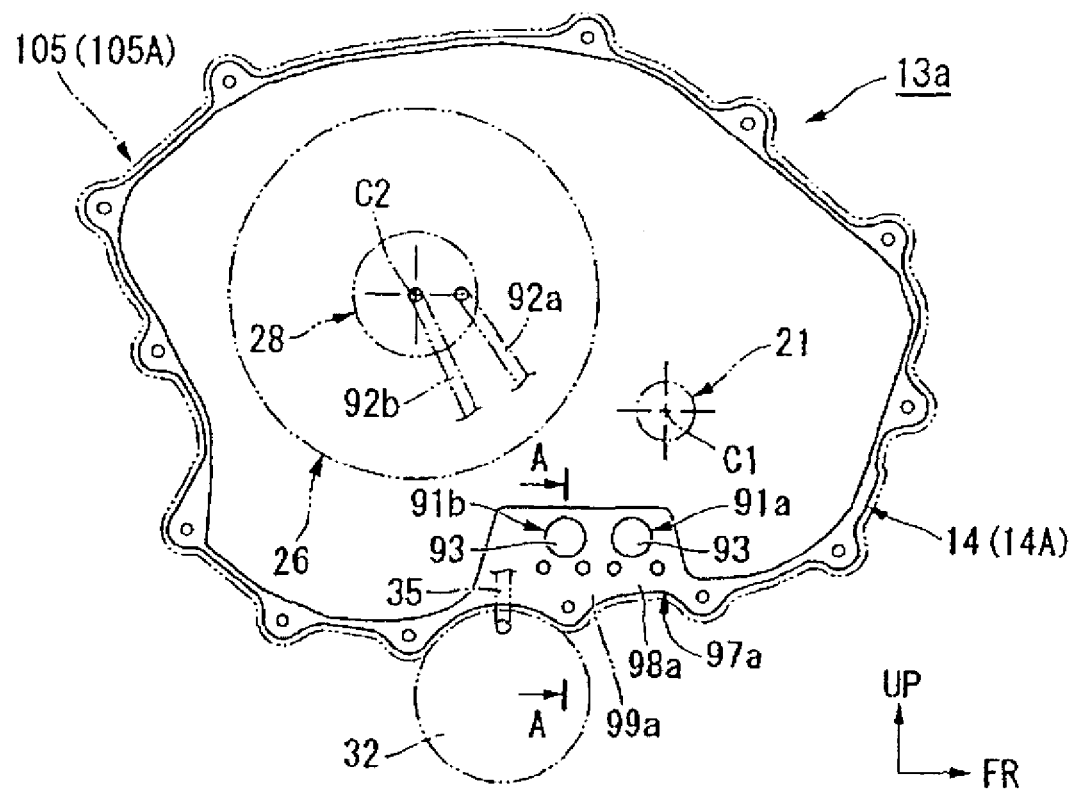
FIG. 9 is a right side view showing a second embodiment of the present invention, corresponding to FIG. 5.
Figure 10:
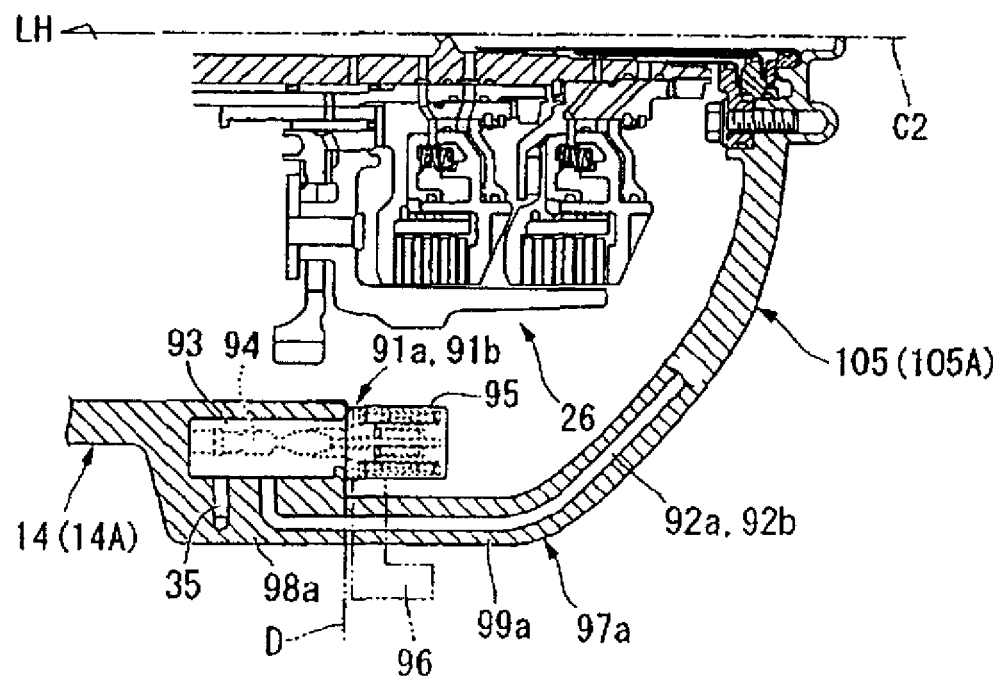
FIG. 10 is a cross sectional view taken along the line A-A of FIG. 9.

Next, a second embodiment of the present invention will be described with reference to FIGS. 9 and 10.

Where an engine 13a of the second embodiment mainly differs from the engine 13 of the first embodiment is that the clutch actuators 91a and 91 are arranged below the twin clutch 26, and the same reference numerals are given to parts identical to those in the first embodiment. Thus, the explanation thereof will be omitted.

The respective clutch actuators 91a and 91b are arranged inside an actuator installing part 97a located at a lower portion (below the twin clutch 26) of the clutch case 105A in a state where the axis lines thereof are directed in the left-right direction and they are arranged in parallel with each other and in a vertically aligned manner.

The actuator installing part 97a protrudes, for example, upward (inside the clutch case 105A) at a lower portion of the clutch case 105A and in the vicinity of the second oil pump 32, and is divided, in the left-right direction, into the crankcase 14-side (a case-side half body 98a) and the clutch cover 105-side (a cover-side half body 99a).

The respective clutch actuators 91a and 91b are arranged in such a manner that the cylinders 93 are arranged on the left side and the linear solenoids 95 are arranged on the right side with the mating face D of the clutch case 105A as the boundary. The cylinders 93 of the clutch actuators 91a and 91b are formed integrally with an outer wall of the case-side half body 98a of the actuator installing part 97a, and thus the respective clutch actuators 91a and 91b are supported by the crankcase 14.

The oil feeding passage 35 and the respective oil-supplying passages 92a and 92b extend inside the outer wall of the case-side half body 98a of the actuator installing part 97a, and are directly connected to the cylinders 93. The oil-supplying passages 92a and 92b extend from the respective cylinders 93 toward the clutch cover 105-side while crossing over the mating face D, and the oil feeding passage 35 extends inside the crankcase 14 from a discharge port of the second oil pump 32, without reaching the clutch cover 105, to be connected to the respective clutch actuators 91a and 91b. It should be noted that the structures of the coupler pulled-out portions of the linear solenoids 95 in the second embodiment are the same as those in the first embodiment.

As described above, even in the engine 13a of the second embodiment, the respective clutch actuators 91a and 91b are arranged around the twin clutch 26, viewed from the crankshaft direction, and inside the engine case 14A. Accordingly, a part of the engine case 14A can be used as a cover for the respective clutch actuators 91a and 91b, and it is possible to simplify and downsize interconnected means provided between the twin clutch 26 and the clutch actuators 91a and 91b.

In the engine 13a, the clutch actuators 91a and 91b are arranged below the twin clutch 26, so that the center of gravity of the vehicle as well as that of the whole engine can be lowered. Further, in the case where the clutch actuators 91a and 91b control a hydraulic pressure supplied to the twin clutch 26, these are arranged closer to the second oil pump 32 inside the engine case 14A on the lower side. Accordingly, the oil passages between the second oil pump 32 and the clutch actuators 91a and 91b can be shortened.

As in the modified example of the first embodiment, a configuration in which the clutch actuators 91a' and 91b' having the cylinders 93' provided separately from the engine case 14A are employed may be adapted. In addition, another configuration in which the clutch actuators are arranged while being replaced with each other may be adapted. In this case, the cylinders may be formed integrally with the clutch cover 105.

Figure 11:
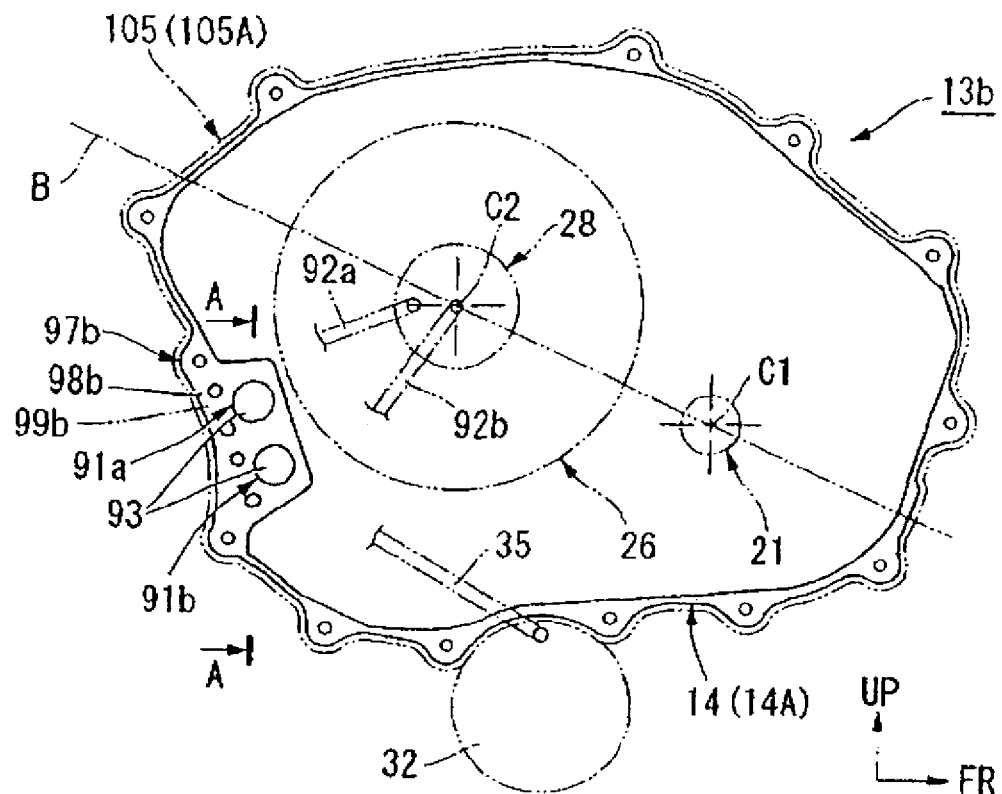
FIG. 11 is a right side view showing a third embodiment of the present invention, corresponding to FIG. 5.
Figure 12:
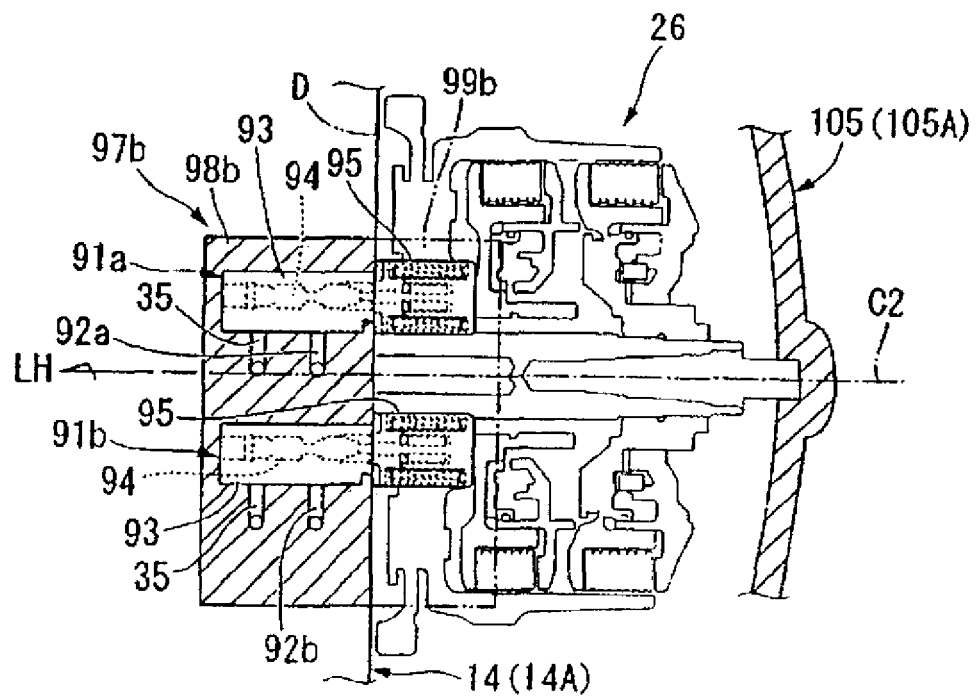
FIG. 12 is a cross sectional view taken along the line A-A of FIG. 11.

Next, a third embodiment of the present invention will be described with reference to FIGS. 11 and 12.

Where an engine 13b of the third embodiment mainly differs from the engine 13 of the first embodiment is that the clutch actuators 91a and 91 are arranged behind the twin clutch 26, and the same reference numerals are given to parts identical to those in the first embodiment. Thus, the explanation thereof will be omitted.

The respective clutch actuators 91a and 91b are arranged inside an actuator installing part 97b located at a rear portion (behind the twin clutch 26) of the clutch case 105A and below the dividing plane B in a state where the axis lines thereof are directed in the left-right direction and they are arranged in parallel with each other and placed above and below.

The actuator installing part 97*b* protrudes, for example, forward (inside the clutch case 105A) at a rear portion of the clutch case 105A, and is divided, in the left-right direction, into the crankcase 14-side (a case-side half body 98*b*) and the clutch cover 105-side (a cover-side half body 99*b*).

The respective clutch actuators 91*a* and 91*b* are arranged in such a manner that the cylinders 93 are arranged on the left side and the linear solenoids 95 are arranged on the right side with mating face D of the clutch case 105A as the boundary. The cylinders 93 of the clutch actuators 91*a* and 91*b* are formed integrally with an outer wall of the case-side half body 98*b* of the actuator installing part 97*b*, and thus the respective clutch actuators 91*a* and 91*b* are supported by the crankcase 14.

The oil feeding passage 35 and the respective oil-supplying passages 92*a* and 92*b* extend inside the outer wall of the case-side half body 98*b* of the actuator installing part 97*b*, and are directly connected to the cylinders 93. It should be noted that the structures of the coupler pulled-out portions of the linear solenoids 95 in the third embodiment are the same as those in the first embodiment.

As described above, even in the engine 13*b* of the third embodiment, the respective clutch actuators 91*a* and 91*b* are arranged around the twin clutch 26, viewed from the crankshaft direction, and inside the engine case 14A. Accordingly, a part of the engine case 14A can be used as a cover for the respective clutch actuators 91*a* and 91*b*, and it is possible to simplify and downsize interconnected means provided between the twin clutch 26 and the clutch actuators 91*a* and 91*b*.

As in the modified example of the first embodiment, a configuration in which the clutch actuators 91*a*' and 91*b*' having the cylinders 93, provided separately from the engine case 14A are employed may be adapted. In addition, another configuration in which the clutch actuators 91*a*' and 91*b*' are arranged while being replaced with each other may be adapted. In this case, the cylinders 93 may be formed integrally with the clutch cover 105.

Figure 13:
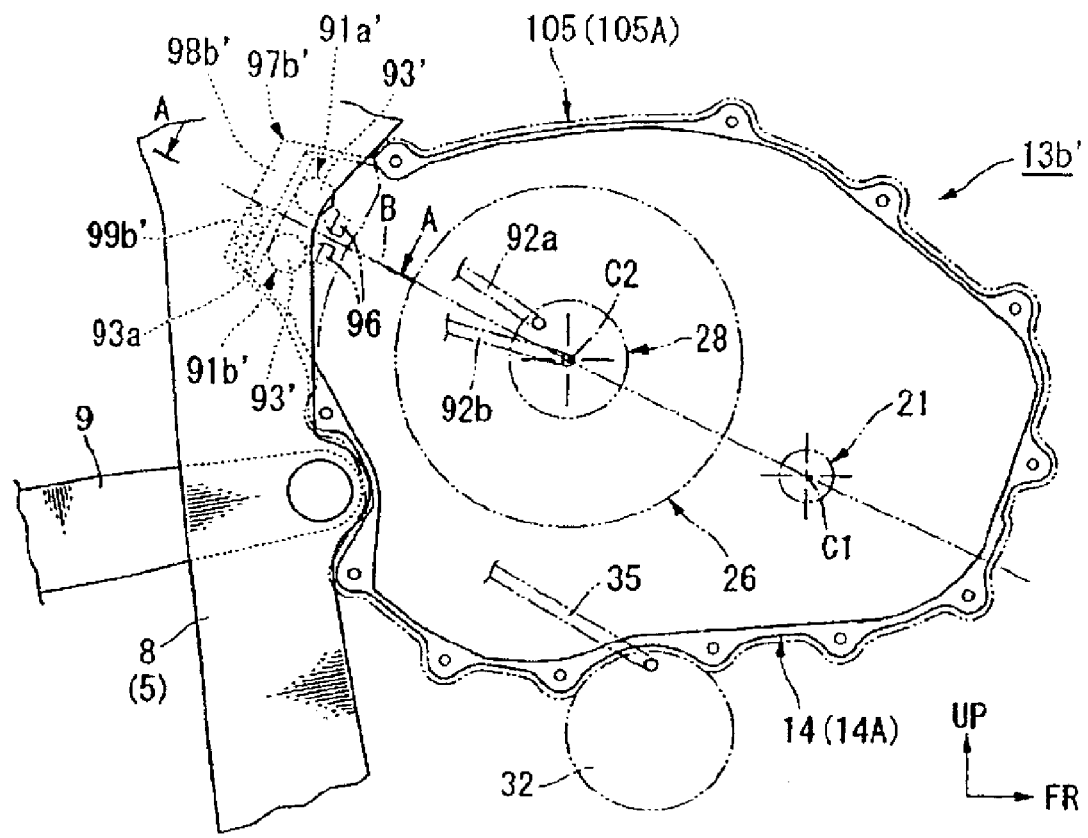
FIG. 13 is a right side view showing a modified example of the third embodiment, corresponding to FIG. 5.
Figure 14:
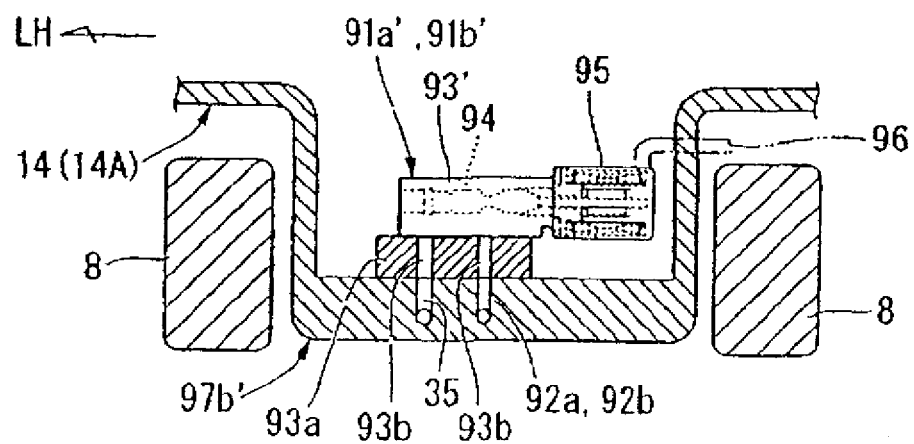
FIG. 14 is a cross sectional view taken along the line A-A of FIG. 13.

In an engine 13*b*' shown in FIGS. 13 and 14, as a modified example of the third embodiment, an actuator installing part 97*b*' is provided at a rear portion (behind the twin clutch 26) of the engine case 14A so as to cross over the dividing plane B, and the clutch actuators 91*a*' and 91*b*' are arranged inside the actuator installing part 97*b*'.

The respective clutch actuators 91*a*' and 91*b*' include the cylinders 93' provided separately from the engine case 14A, and are arranged in a state where the axis lines thereof are directed in the left-right direction and they are arranged in parallel with each other and placed above and below while crossing over the dividing plane B.

The actuator installing part 97*b*' protrudes rearward (outside the clutch case 105A) at a rear portion of the crankcase 14A, and enters a space formed between the left and right pivot plates 8 of the body frame 5 located immediately behind the crankcase 14 and formed above a front end of the swing arm 9. Hereinafter, regions located above and below the dividing plane B in the actuator installing part 97*b*' are referred to as an upper half body 98*b*' and a lower half body 99*b*', respectively.

A base member 93*a* for fixing the clutch actuators 91*a*' and 91*b*' is fixed, from the inside of the case, to an outer wall of one of the upper and lower half bodies 98*b*' and 99*b*' of the actuator installing part 97*b*' with bolts or the like, and the clutch actuators 91*a*' and 91*b*' are supported inside the crankcase 14. Communication passages 93*b* through which the respective oil passages 35, 92*a*, and 92*b* that extend inside the outer wall of the actuator installing part 97*b*' and the respective cylinders 93' are in communication with each other are formed in the base member 93*a*.

The couplers 96 for connecting electric power supplying harnesses in the linear solenoids 95 are pulled out from notches formed on the outer walls of the upper and lower half bodies 98*b*' and 99*b*' of the actuator installing part 97*b*'. A base part of each coupler 96 is fitted into the notch through a seal member, and the upper and lower half bodies of the crankcase 14 are coupled to each other in this state. Accordingly, the base part of each coupler 96 is sandwiched in the crankcase 14 in a sealed state.

According to the engine 13*b*' in the above-described modified example, the clutch actuators 91*a*' and 91*b*' are arranged, behind the twin clutch 26, between the pair of left and right pivot plates 8 for swingably supporting a front end of the swing arm 9 to which the drive wheel is journaled and above a front end of the swing arm 9. Accordingly, a space formed between the left and right pivot plates 8 and above a front end of the swing arm 9 can be effectively used as an arrangement space for the clutch actuators 91*a*' and 91*b*'. Further, the clutch actuators 91*a*' and 91*b*' are arranged so as to cross over the dividing plane B of the crankcase 14, so that it is possible to easily realize the formation of the coupler pulled-out portions of the clutch actuators 91*a*' and 91*b*' and the seal structure therefor.

Figure 15:
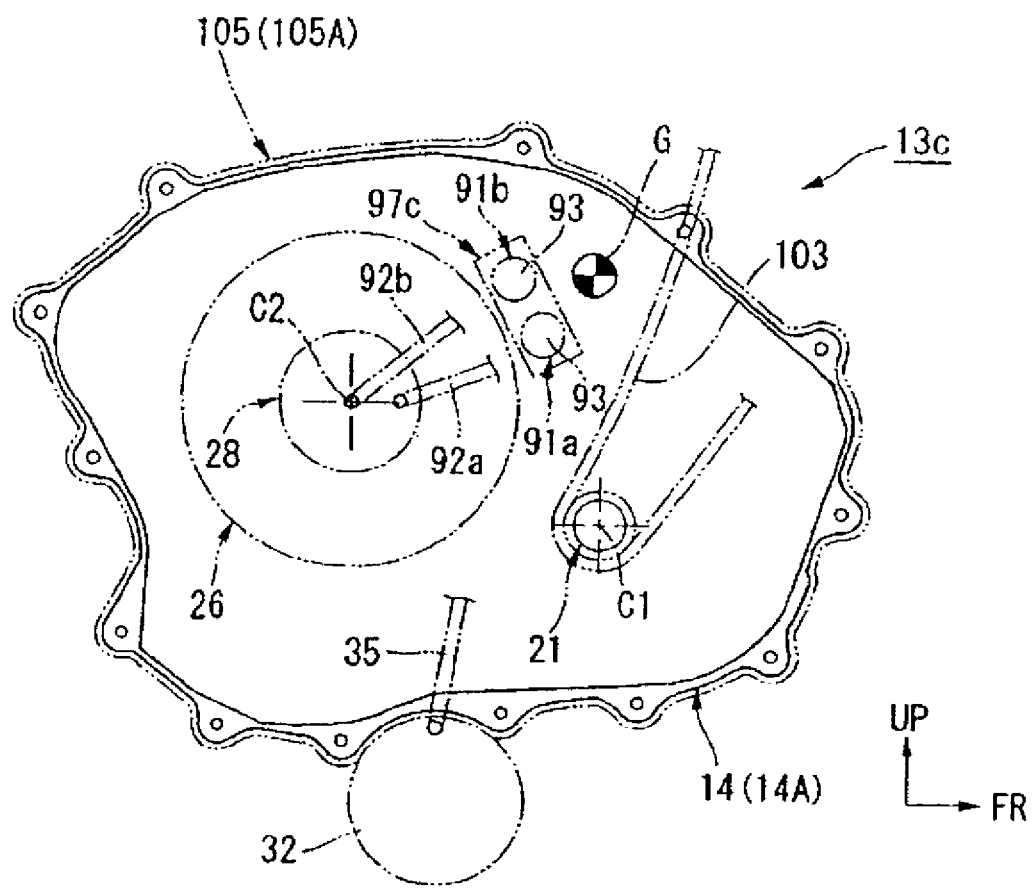
FIG. 15 is a right side view showing a fourth embodiment of the present invention, corresponding to FIG. 5.

Next, a fourth embodiment of the present invention will be described with reference to FIG. 15.

Where an engine 13*c* of the fourth embodiment mainly differs from the engine 13 of the first embodiment is that the clutch actuators 91*a* and 91 are arranged in front of the twin clutch 26, and the same reference numerals are given to parts identical to those in the first embodiment. Thus, the explanation thereof will be omitted.

The respective clutch actuators 91*a* and 91*b* are arranged inside an actuator installing part 97*c* located at a front portion of the clutch case 105A in a state where the axis lines thereof are directed in the left-right direction and they are arranged in parallel with each other and placed above and below.

The clutch actuators 91*a* and 91*b* are arranged behind a chain line on the rear side of the cam chain 103 and arranged adjacent to the center of gravity C of the engine located substantially right above the crankshaft 21. The left and right directions of the clutch actuators 91*a* and 91*b* are not considered as similar to the respective embodiments. In the clutch actuators 91*a* and 91*b*, the cylinders 93 are formed integrally with the actuator installing part 97*c*, however, a configuration in which the clutch actuators 91*a*' and 91*b*' having the cylinders 93' provided separately from the engine case 14A are employed may be adapted.

According to the engine 13*c* in the fourth embodiment, the clutch actuators 91*a* and 91*b* are arranged between the cam chain 103 wound between the crankshaft 21 and the cam shafts 101 and 102, and the twin clutch 26, so that a space formed between the twin clutch 26 and the cam chain 103 can be effectively used as an arrangement space for the clutch actuators 91*a* and 91*b*. Further, by arranging the clutch actuators 91*a* and 91*b* adjacent to the center of gravity G of the engine, the concentration of mass in the whole engine can be achieved.

Next, a fifth embodiment of the present invention will be described. The same reference numerals are given to parts identical to those in the respective embodiments. Thus, the explanation thereof will be omitted.

Figure 16:
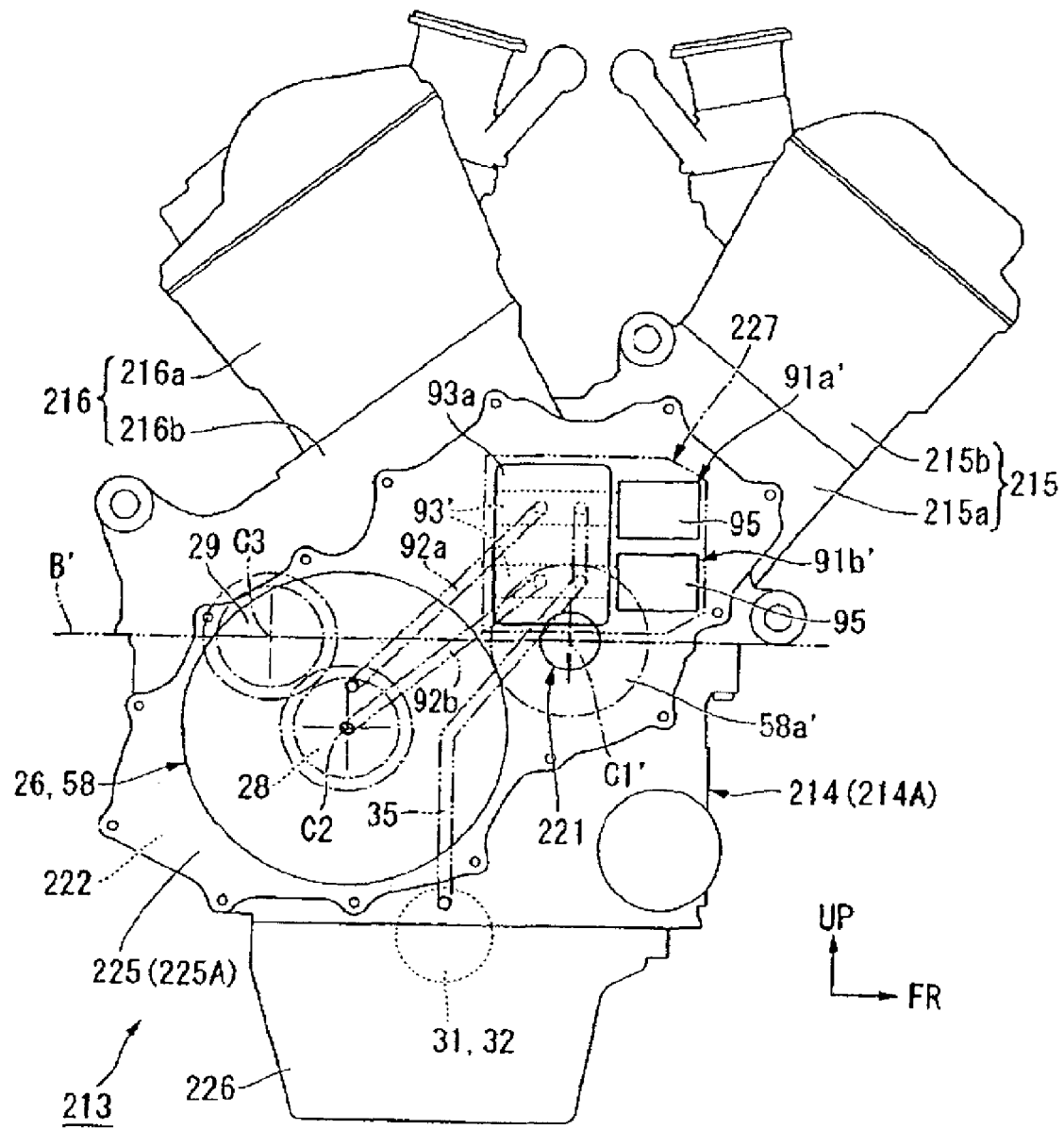
FIG. 16 is a right side view showing a fifth embodiment of the present invention, corresponding to FIG. 2.

An engine 213 shown in FIG. 16 is a V four-cylinder engine in which a crankshaft axis line C1' is directed in the vehicle-width direction (the left-right direction), and a forward-inclined cylinder part 215 uprising obliquely-upward to the front and a rearward-inclined cylinder part 216 uprising obliquely-upward to the rear are provided on a crankcase 214 in an erect manner. The cylinder parts 215 and 216 include cylinders 215a and 216b which are provided integrally with the crankcase 214, and cylinder heads 215a and 216b which are attached on the cylinders 215a and 216a, respectively.

Pistons (not shown) are fitted into the respective cylinders 215a and 216a, and reciprocating motions of the pistons are converted into rotational motions of a crankshaft 221 through a connecting rod. The rotational drive power of the crankshaft 221 is input to the twin-clutch transmission 23 from a primary drive gear 58a' located at a right portion of the crankshaft 221, and then is transmitted to the rear wheel 11 from the rear left side of the crankcase 214 through, for example, a chain-drive-type power transmission mechanism.

The engine 213 has a structure in which the transmission part is provided integrally therewith, and a transmission case 222 for accommodating therein the twin-clutch transmission 23 and the change mechanism 24 is configured at a rear portion of the crankcase 214. Specifically, the cylinders 215a and 216a, and the transmission case 222 are integrally formed in the crankcase 214.

A clutch cover 225 protruding rightward from a right face of the crankcase 214 is attached to the right face, and an oil pan 226 protruding downward from a lower face of the crankcase 214 is attached to the lower face. Hereinafter, an assembly of the crankcase 214, the clutch cover 225, the oil pan 226, and the like is referred to as an engine case 214A.

The twin clutch 26 of the twin-clutch transmission 23 and the primary drive gear 58a' located in front of the twin clutch 26 protrude to the right relative to a right face of the crankcase 214, and the clutch cover 225 is provided so as to cover the twin clutch 26 and the primary drive gear 58a'. The clutch cover 225, together with a right portion of the crankcase 214, configures a clutch case 225A for accommodating therein the twin clutch 26 and the primary drive gear 58a'.

In the engine 213, three main shafts, namely, the crankshaft 221, the main shaft 28 and the counter shaft 29 are arranged while forming a triangle. Specifically, the axis lines C1' and C3 of the crankshaft 221 and the counter shaft 29 are arranged on an up/down dividing plane B' which is substantially horizontal in the crankcase 214, and the axis line C2 of the main shaft 28 is arranged below the dividing plane B' and in front of the counter shaft 29.

The engine 213 has the crankshaft 221 which is shorter in length and the crankcase 214 which is narrower in the left-right width, as compared to the parallel four-cylinder engine. Accordingly, a protruding amount of the clutch cover 225 to the right becomes relatively larger. The respective clutch actuators 91' and 91b' are provided inside the clutch cover 225. The oil feeding passage 35, and the oil-supplying passages 92a and 92b are formed in the clutch cover 225.

Figure 17:
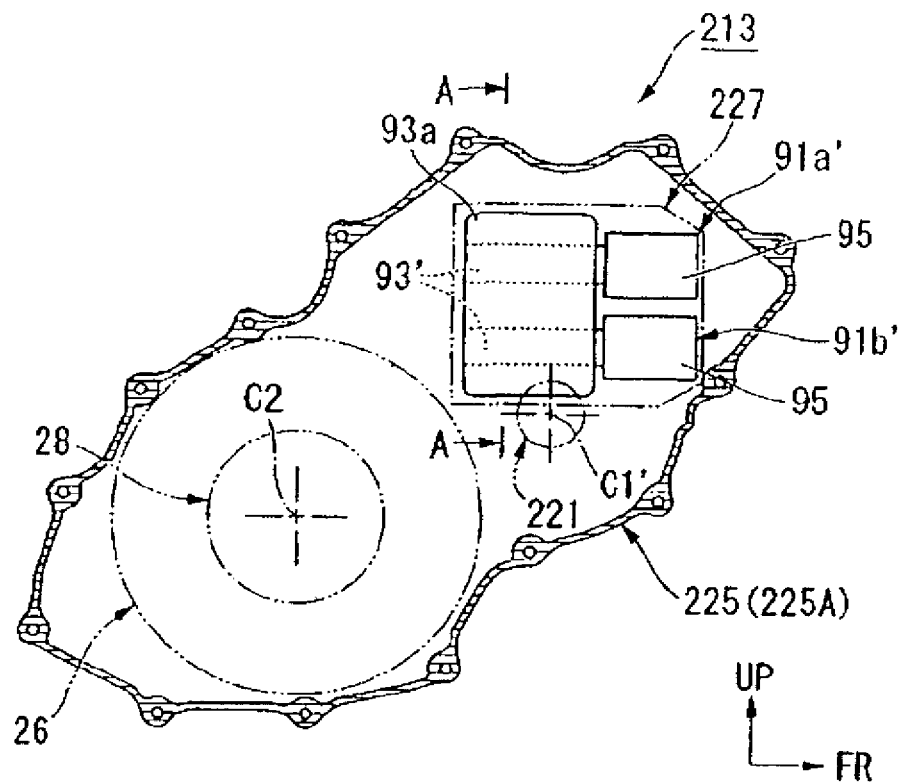
FIG. 17 is a right side view mainly showing a clutch cover of the engine shown in FIG. 16, corresponding to FIG. 5.
Figure 18:
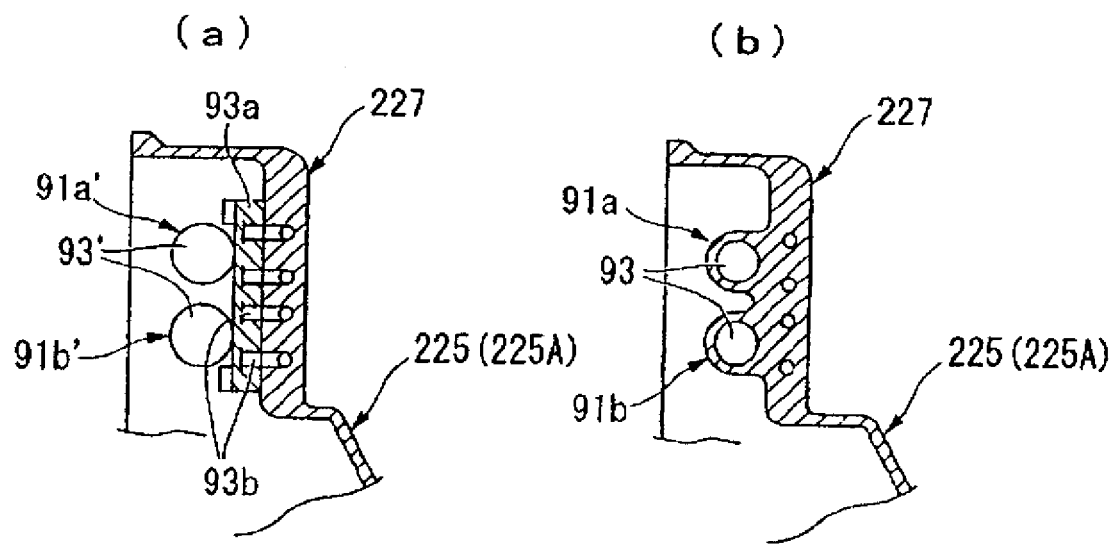
FIG. 18(*a*) is a cross sectional view taken along the line A-A of FIG. 17, and FIG. 18(*b*) is a cross sectional view showing a modified example of FIG. 18(*a*)

As shown in FIGS. 17 and 18(a), the respective clutch actuators 91a' and 91b' are arranged inside an actuator installing part 227 located at a front portion (in front of the twin clutch 26) of the clutch cover 225 in a state where the axis lines thereof are directed in the front-rear direction (orthogonal to the left-right direction) and they are arranged in parallel with each other and placed, for example, above and below.

The respective clutch actuators 91a' and 91b' are arranged in such a manner that the cylinders 93' are arranged on the rear side and the linear solenoids 95 are arranged on the front side. The base member 93a for fixing the cylinders 93' is fixed, from the inside of the clutch cover 225, to an outer wall (a right outer wall of the clutch cover 225) of the actuator installing part 227 with bolts or the like, and thus the clutch actuators 91a' and 91b' are supported inside the clutch case 225A. Communication passages 93b through which the respective oil passages 35, 92a, and 92b that extend inside the outer wall of the actuator installing part 227, and the respective cylinders 93' are in communication with each other are formed in the base member 93a.

As described above, even in the engine 213 of the fifth embodiment, the respective clutch actuators 91a' and 91b' are arranged around the twin clutch 26, viewed from the crankshaft direction, and inside the engine case 214A. Accordingly, a part of the engine case 214A can be used as a cover for the respective clutch actuators 91a' and 91b', and it is possible to simplify and downsize interconnected means provided between the twin clutch 26 and the clutch actuators 91a' and 91b'.

As shown in FIG. 18(b), a configuration in which the clutch actuators 91a and 91b having the cylinders 93 provided integrally with the engine case 214A (the clutch cover 225) are employed in place of the clutch actuators 91a' and 91b' may be adapted.

According to the above-described modified example, the cylinders 93 are provided integrally with the engine case 214A, so that assembling of the respective clutch actuators 91a and 91b, and attaching of the respective clutch actuators 91a and 91b to the engine case 214A can be performed only by inserting the pistons 94 into the cylinders 93 and by attaching the linear solenoids 95.

Figure 19:
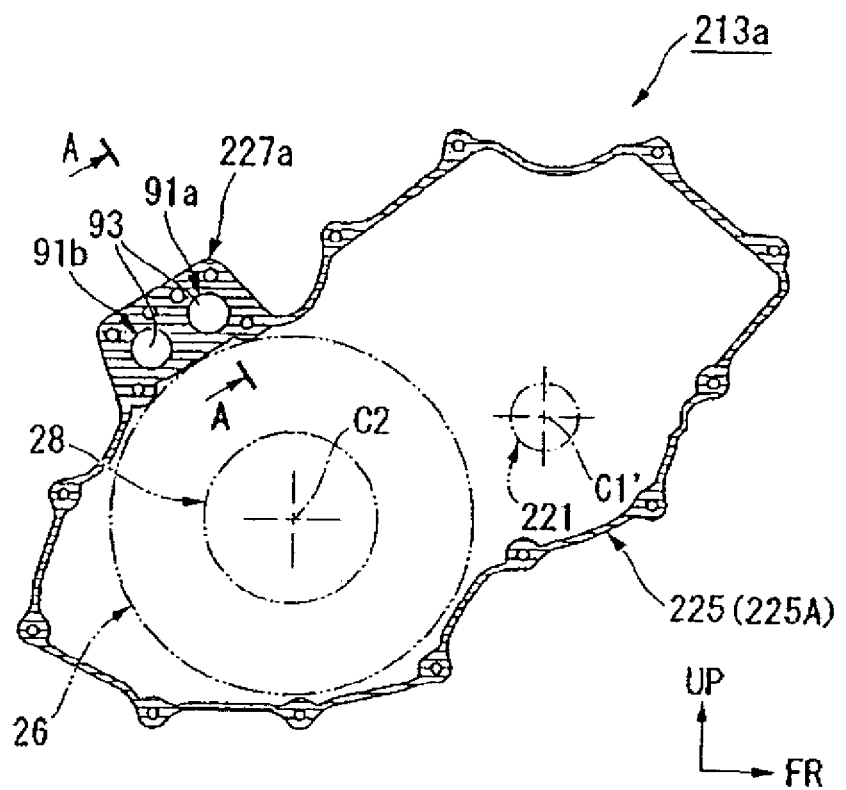
FIG. 19 is a right side view showing a sixth embodiment of the present invention, corresponding to FIG. 15.

Next, a sixth embodiment of the present invention will be described with reference to FIGS. 19 and 20(a).

Where an engine 213a of the sixth embodiment mainly differs from the engine 213 of the fifth embodiment is that the clutch actuators 91a and 91b are arranged above the twin clutch 26, and the same reference numerals are given to parts identical to those in the fifth embodiment. Thus, the explanation thereof will be omitted.

The respective clutch actuators 91a and 91b are arranged inside an actuator installing part 227a located at an upper portion (above the twin clutch 26) of the clutch case 225A in a state where the axis lines thereof are directed in the left-right direction and they are arranged in parallel with each other and in a vertically aligned manner.

The actuator installing part 227a protrudes upward (outside the clutch case 225A) at an upper portion of the clutch case 225A, and is divided into the crankcase 214-side (a case-side half body 228a) and the clutch cover 225-side (a cover-side half body 229a).

The respective clutch actuators 91a and 91b are arranged in such a manner that the cylinders 93 are arranged on the right side and the linear solenoids 95 are arranged on the left side with the mating face D' of the clutch case 225A as the boundary. The cylinders 93 of the clutch actuators 91a and 91b are formed integrally with an outer wall of the cover-side half body 229a of the actuator installing part 227a, and thus the respective clutch actuators 91a and 91b are supported by the clutch cover 225. The oil feeding passage 35 and the respective oil-supplying passages 92a and 92b extend inside the outer wall of the cover-side half body 229a of the actuator installing part 227a, and are directly connected to the cylinders 93.

As described above, even in the engine 213a of the sixth embodiment, the respective clutch actuators 91a and 91b are arranged around the twin clutch 26, viewed from the crankshaft direction, and inside the engine case 214A. Accordingly, a part of the engine case 214A can be used as a cover for the respective clutch actuators 91a and 91b, and it is possible to simplify and downsize interconnected means provided between the twin clutch 26 and the clutch actuators 91a and 91b.

In addition, the respective clutch actuators 91a and 91b are arranged above the twin clutch 26. Accordingly, it is possible to shorten the electric power supplying harnesses, which extend from upper portions of the vehicle, for the respective clutch actuators 91a and 91b, and to facilitate the connecting work.

Figure 20:
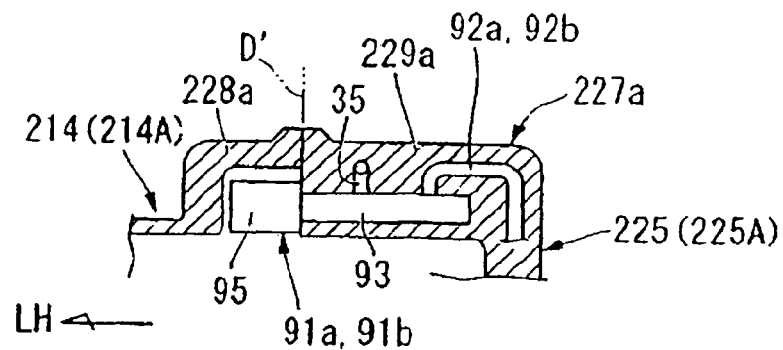
FIG. 20(*a*) is a cross sectional view taken along the line A-A of FIG. 19, and FIGS. 20(*b*), 20(*c*), and 20(*d*) are cross sectional views, each showing a modified example of FIG. 20(*a*)
Figure 20:
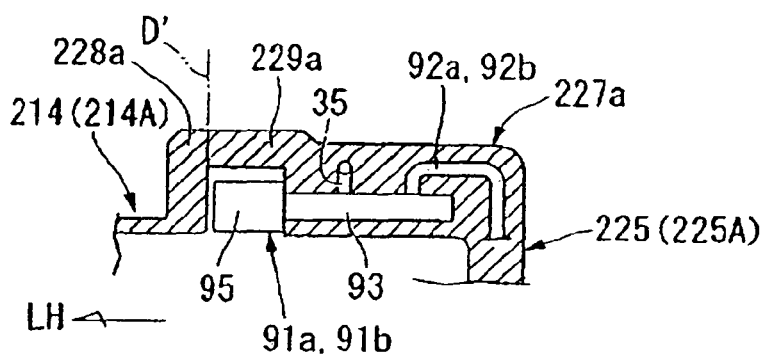
Figure 20:
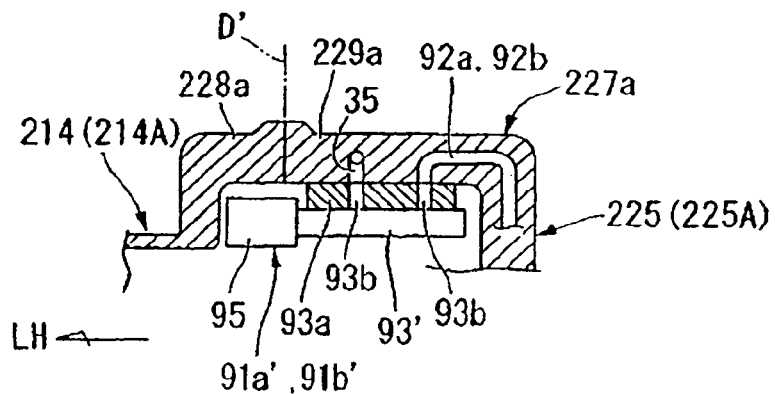
Figure 20:
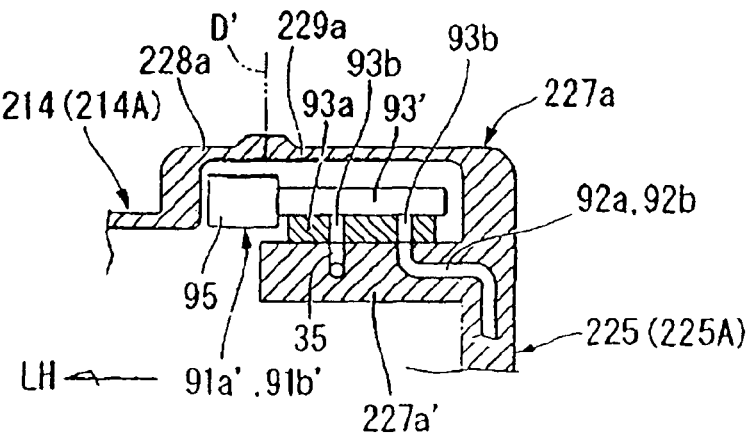

As shown in FIG. 20(b), if the respective clutch actuators 91a and 91b are located on the right side relative to the mating face D' of the clutch case 225A, the configuration of the case-side half body 228a in the actuator installing part 227a can be simplified.

Further, as shown in FIG. 20(c), a configuration in which the clutch actuators 91a' and 91b' having the cylinders 93' provided separately from the engine case 214A (the clutch cover 225) are employed may be adapted. In this case, the base member 93a for supporting the cylinders 93' may be fixed to the outer wall of the actuator installing part 227a (the clutch cover 225). Alternatively, as shown in FIG. 20(d), an additional inner wall 227a' is formed in the actuator installing part 227a (the clutch cover 225), and the base member 93a may be fixed to the inner wall 227a'.

Figure 21:
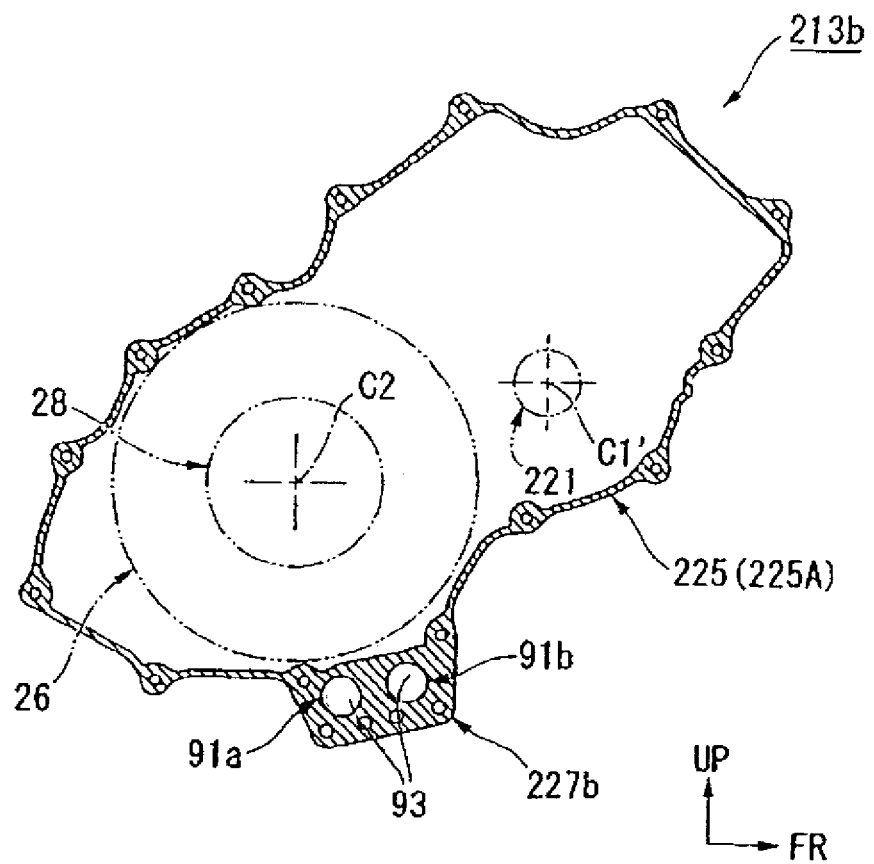
FIG. 21 is a right side view showing a seventh embodiment of the present invention, corresponding to FIG. 15.

Next, a seventh embodiment of the present invention will be described with reference to FIG. 21.

Where an engine 213b of the seventh embodiment mainly differs from the engine 213 of the fifth embodiment is that the clutch actuators 91a and 91b are arranged below the twin clutch 26, and the same reference numerals are given to parts identical to those in the fifth embodiment. Thus, the explanation thereof will be omitted.

The respective clutch actuators 91a and 91b are arranged inside an actuator installing part 227b located at a lower portion (below the twin clutch 26) of the clutch case 225A in a state where the axis lines thereof are directed in the left-right direction and they are arranged in parallel with each other and in a vertically aligned manner.

The actuator installing part 227b protrudes downward (outside the clutch case 225A) at a lower portion of the clutch case 225A, and is divided into the crankcase 214-side and the clutch cover 225-side, as similar to the actuator installing part 227a.

As similar to the sixth embodiment, the respective clutch actuators 91a and 91b are arranged in such a manner that the cylinders 93 and the linear solenoids 95 are sorted on the right and left sides with the mating face of the clutch case 225A as the boundary, or the respective clutch actuators 91a and 91b are arranged on the right side (the clutch cover 225-side) relative to the mating face. Further, a configuration in which the clutch actuators 91a' and 91b' having the cylinders 93' provided separately from the engine case 214A (the clutch cover 225) are employed may be adapted. In this case, the base member 93a for fixing the cylinders 93' may be fixed to the outer wall of the actuator installing part 227b (the clutch cover 225). Alternatively, the base member 93a may be fixed to an inner wall which is additionally provided in the actuator installing part 227b (the clutch cover 225).

As described above, even in the engine 213b of the seventh embodiment, the respective clutch actuators 91a and 91b are arranged around the twin clutch 26, viewed from the crankshaft direction, and inside the engine case 214A. Accordingly, a part of the engine case 214A can be used as a cover for the respective clutch actuators 91a and 91b, and it is possible to simplify and downsize interconnected means provided between the twin clutch 26 and the clutch actuators 91a and 91b.

Further, the clutch actuators 91a and 91b are arranged below the twin clutch 26, so that the center of gravity of the vehicle as well as the whole engine can be lowered. Further, the oil passages between the second oil pump 32 and the clutch actuators 91a and 91b can be shortened.

The present invention is not limited to the above-described embodiments. For example, the clutch actuators may control mechanical power and electric power without controlling a hydraulic pressure supplied to the clutches. As similar thereto, the interconnected means between the clutches and the clutch actuators may not be the hydraulic pathways, but mechanical pathways or electric pathways.

In addition, the configuration of the present invention can be applied to single cylinder engines, in-line engines, vertically-placed engines whose crankshaft axis lines are directed in the front-rear direction, and reciprocating engines of various types. Furthermore, the vehicle in which the engine is mounted is not limited to the motorcycle, but may be a saddle-ride type three-wheeled or four-wheeled vehicle, or a scooter-type vehicle having low-floor footrests.

The configurations of the above-described embodiments are examples, and may be variously modified within a range without departing from the gist of the present invention.

We claim:

1. An engine, comprising:
   a crankshaft for transmission of rotational drive power to a drive wheel;
   a clutch mechanism for connecting or disconnecting said transmission of rotational drive power of said crankshaft to said drive wheel;
   clutch actuators; and
   an engine case,
   wherein said clutch mechanism, said crankshaft, and said clutch actuators are entirely accommodated within said engine case, and
   wherein said clutch actuators control said clutch mechanism and are positioned outside said clutch mechanism, viewed from the crankshaft direction.

2. The engine of claim 1, said engine case further comprising:
   a crankcase for rotatably supporting the crankshaft,
   wherein said clutch actuators are provided in said crankcase.

3. The engine of claim 1, said engine case further comprising:
   a crankcase for rotatably supporting the crankshaft; and
   a clutch cover which forms a clutch chamber that is coupled to the crankcase,
   wherein said clutch chamber and said crankcase accommodate said clutch mechanism, and
   wherein said clutch actuators are disposed in said clutch cover.

4. The engine of claim 1, said clutch actuators further comprising:
   cylinders connected to a plurality of oil passages, said cylinders provided integrally with said engine case;
   pistons which are operated inside said cylinders to switch communication states of said respective oil passages, and
   linear solenoids which control operations of said pistons,
   wherein a connecting/disconnecting operation of said clutch mechanism is controlled by a hydraulic pressure supplied through said clutch actuators.

5. The engine of claim 1, wherein said clutch actuators are positioned above said clutch mechanism.

6. The engine of claim 1, wherein said clutch actuators are positioned below said clutch mechanism.

7. The engine of claim 1, wherein said clutch actuators are positioned behind said clutch mechanism, between a pair of left and right pivot plates for swingably supporting a front end of a swing arm to which said drive wheel is journaled and above a front end of said swing arm.

8. The engine of claim 1, wherein said clutch actuators are positioned between said clutch mechanism and a cam chain that is wound between said crankshaft and cam shaft.

9. The engine of claim 1, wherein the engine is provided in a saddle-ride vehicle.

10. The engine of claim 1, wherein each of said clutch actuators comprises:
- a cylinder connected to an oil feeding passage and a first or second oil-supplying passage;
- a piston operated inside said cylinder, wherein said piston switches communication states of the oil feeding passage, between the first oil-supplying passage and the second oil supplying passage; and
- a solenoid controlling the operation of said piston.

* * * * *